(12) United States Patent
Fujino et al.

(10) Patent No.: US 11,289,282 B2
(45) Date of Patent: Mar. 29, 2022

(54) SWITCH AND OPERATION DEVICE HAVING A FLEXIBLE SWINGING MEMBER

(71) Applicant: OMRON Corporation, Kyoto (JP)

(72) Inventors: Hiroaki Fujino, Kyoto (JP); Kenji Takahama, Kurayoshi (JP); Yoshinori Ijiri, Kurayoshi (JP); Kazufumi Osaki, Okayama (JP); Keigo Nakahata, Okayama (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 17/000,594

(22) Filed: Aug. 24, 2020

(65) Prior Publication Data

US 2021/0090825 A1 Mar. 25, 2021

(30) Foreign Application Priority Data

Sep. 19, 2019 (JP) .............................. JP2019-170474

(51) Int. Cl.
*H01H 13/14* (2006.01)
*G05B 15/02* (2006.01)
*H01H 13/02* (2006.01)

(52) U.S. Cl.
CPC ............. *H01H 13/14* (2013.01); *G05B 15/02* (2013.01); *H01H 13/023* (2013.01); *H01H 2219/062* (2013.01); *H01H 2219/064* (2013.01)

(58) Field of Classification Search
CPC ...... G05B 15/02; H01H 13/023; H01H 13/14; H01H 13/36–2219/062; H01H 13/064; G06F 3/0304; G06F 3/033; G06F 3/03543
See application file for complete search history.

(56) References Cited

U.S. PATENT DOCUMENTS

| | | | | |
|---|---|---|---|---|
| 2,374,986 A | * | 5/1945 | Fetter | H01H 13/36 200/454 |
| 4,764,649 A | * | 8/1988 | Sakai | H01H 13/36 200/412 |
| 4,904,832 A | * | 2/1990 | Nagahara | H01H 13/36 200/402 |

(Continued)

FOREIGN PATENT DOCUMENTS

| | | |
|---|---|---|
| CN | 102144271 B | 1/2014 |
| JP | 2008-210654 A | 9/2008 |

(Continued)

OTHER PUBLICATIONS

The Office Action (TWOA) dated Dec. 28, 2020 in a counterpart Taiwanese patent application.

*Primary Examiner* — Vanessa Girardi

(74) *Attorney, Agent, or Firm* — Metrolex IP Law Group, PLLC

(57) ABSTRACT

A switch used in an operation device such as a mouse has flexibility, and includes a movable member in which a first end side is fixed as a swing fulcrum and a second end side swings, and a pressing member that presses a portion between the first end and the second end of the movable member by receiving a pressing force from an outside source. Bent portions that are bent in a swinging direction are formed in side portions of the movable member. When the movable member warps by being pressed by the pressing member, the bent portions resist against the warping of the movable member, and therefore an operator can have click feeling.

16 Claims, 41 Drawing Sheets

(56) References Cited

U.S. PATENT DOCUMENTS 6,075,518 A * 6/2000 Pruchniak ............. G06F 1/1601
345/157
2017/0032901 A1 2/2017 Long et al.

FOREIGN PATENT DOCUMENTS

TW 434613 B 5/2001
WO 2015/196630 A1 12/2015

* cited by examiner

FIG. 22A　　　　　　　　　　　　　　　　　28
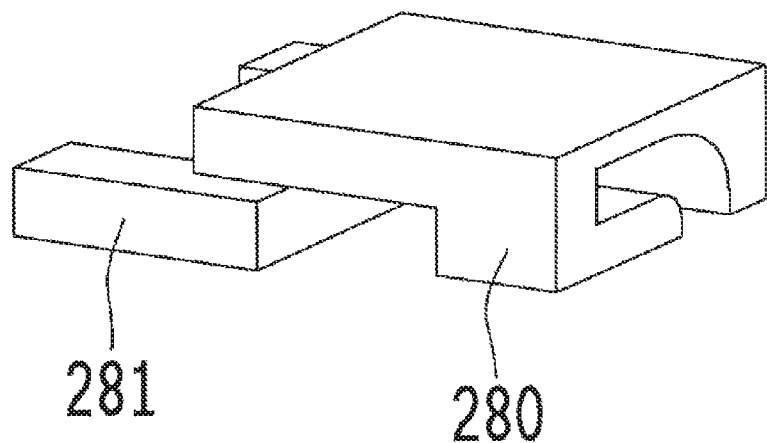
FIG. 22B　　　　　　　　　　　　　　　　　29
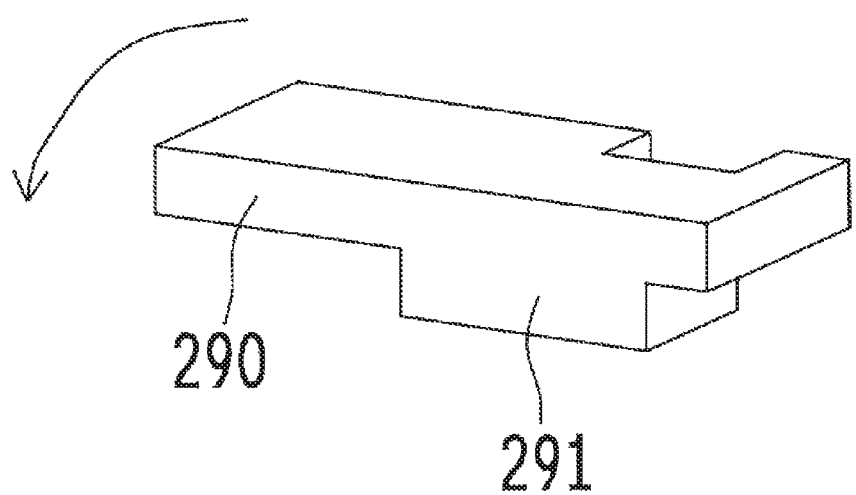

SWITCH AND OPERATION DEVICE HAVING A FLEXIBLE SWINGING MEMBER

CROSS-REFERENCES TO RELATED APPLICATIONS

This application claims priority to Japanese Patent Application No. 2019-170474 filed Sep. 19, 2019, the entire contents of which are incorporated herein by reference.

FIELD

The present disclosure relates to a switch that includes a movable member having flexibility and a pressing member that presses the movable member upon receiving a pressing force from an outside source, and opens/closes a circuit as a result of the movable member swinging upon being pressed by the pressing member, and an operation device using such a switch.

BACKGROUND

Switches to be used in devices such as electronic apparatuses have become widespread. For example, in JP 2008-210654A, a switch is disclosed that includes both characteristics of a slide-type switch and a snap action-type switch, and as a result of pushing down an operation button, an inner actuator is pressed, which causes a movable contact to be brought into contact with a normally open contact. The switch disclosed in JP 2008-210654A is structured such that the movable contact is brought into sliding-contact with the normally open contact, and therefore a collision sound is not generated and the quietness is improved.

Regarding a switch such as that disclosed in JP 2008-210654A, there is a demand for improving feeling when the operation button is pushed down, that is, so-called click feeling, when the switch is applied to a mouse, for example. On the other hand, with a switch that is developed by pursuing quietness such as that disclosed in JP 2008-210654A, there are cases where the click feeling is hindered.

In view of these circumstances, a switch may be provided, with which it is possible to improve click feeling.

Also, an operation device using such a switch may be provided.

SUMMARY

In order to solve the above described and other problems, a switch described in the present application is a switch having flexibility that includes a movable member in which a first end side is fixed as a swing fulcrum and a second end side swings, and a pressing member that presses a portion between a first end and a second end of the movable member by receiving a pressing force from an outside source, and opens/closes a circuit as a result of the movable member swinging by being pressed by the pressing member, wherein the movable member is provided with a bent portion that is bent in a swinging direction.

Also, in the switch, the movable member is provided with a biasing portion that generates a reaction force that resists against pressing of the pressing member between a pressed part that receives pressing of the pressing member and the second end.

Also, in the switch, the bent portion is formed between the pressed part and the first end.

Also, in the switch, the bent portion is formed between the pressed part and the second end.

Also, in the switch, the movable member is formed so as to warp by receiving the pressing force of the pressing member, and open/close a circuit by, upon receiving further pressing, the second end side swinging with a locking portion to which the biasing portion is locked being a swing axis.

Also, in the switch, the pressing member comes into contact with the movable member at a plurality of contact parts and presses the movable member.

Also, in the switch, the pressing member includes the contact parts on the first end side and the second end side relative to a center of a force of pressing the movable member by receiving a pressing force from an outside source.

Also, the switch further includes a buffering member that is provided so as to come into contact with the movable member.

Also, in the switch, the buffering member is a biasing portion buffering member that is provided so as to come into contact with the biasing portion.

Also, in the switch, the buffering member is a contact buffering member that is provided such that the second end side of the movable member is brought into contact when the pressing member is not pressed from the outside.

Also, the switch further includes an optical contact including a light emitting circuit and a light receiving circuit, wherein the movable member includes a light blocking piece that blocks/transmits light emitted from the light emitting circuit of the optical contact by swinging.

Also, in the switch, the light blocking piece has a thin plate shape provided with a transmission window through which light passes.

Also, the switch further includes an optical contact terminal that is electrically connected to the optical contact, wherein the optical contact is formed as a surface mounting type chip, and is surface-mounted on the optical contact terminal.

Also, in the switch, the optical contact terminal is provided with a recess for surface-mounting the optical contact.

Also, in the switch, the optical contact is mounted so as to extend between a plurality of optical contact terminals.

Moreover, an operation device described in the present application includes a pressing down operation portion for receiving a pressing down operation from the outside; and the switch to which a pressing down operation received by the pressing down operation portion is transmitted as pressing from the outside, and outputs a signal based on a motion of the movable member included in the switch.

The switch and the operation device that are described in the present application include a movable member in which a bent portion that is bent in a swinging direction is formed.

In the switch and the operation device according to the present invention, a bent portion that is bent in a swinging direction is formed in a movable member that swings by pressing by a pressing member that receives pressing from the outside, and opens/closes a circuit. With this, superior effects such as being able to improve feeling that is generated when pressing are exerted.

BRIEF DESCRIPTION OF THE DRAWINGS

FIG. 22A is a schematic perspective view illustrating one example of a buffering member included in the switch described in the present application.

FIG. 22B is a schematic perspective view illustrating one example of the buffering member included in the switch described in the present application.

DETAILED DESCRIPTION

Application Examples

The operation device described in the present application is used as an operation device such as a mouse that is used to operate a personal computer, for example. Also, the switch described in the present application is used, as a micro switch, in devices such as various electronic apparatuses including the operation device. In the following, an operation device 1 and a switch 2 that are illustrated in drawings will be described with reference to the drawings.

First Embodiment

Operation Device 1

Figure 1:
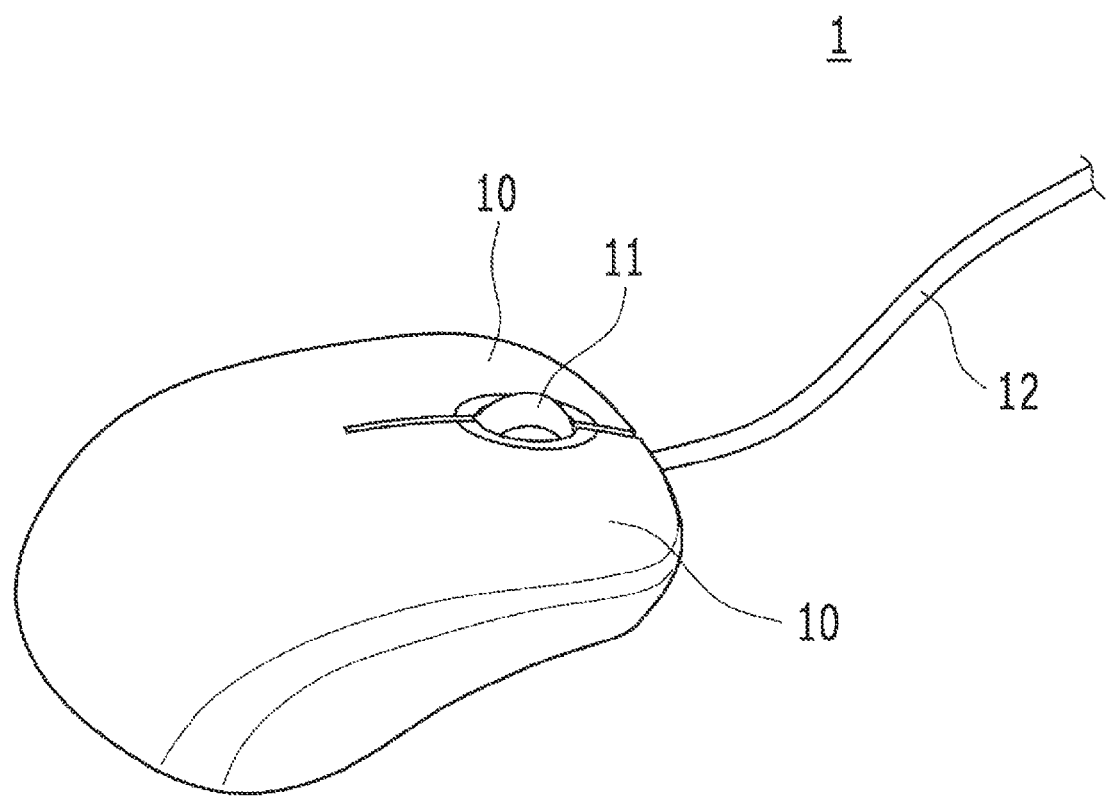
FIG. 1 is a schematic perspective view illustrating one example of an external view of an operation device described in the present application.

First, the operation device 1 will be described. FIG. 1 is a schematic perspective view illustrating one example of an external view of the operation device 1 described in the present application. FIG. 1 shows an example in which the operation device 1 described in the present application is applied to a mouse that is used to operate an electronic apparatus such as a personal computer. The operation device 1 includes pressing down operation portions 10 such as mouse buttons for receiving a pressing down operation performed by a finger of an operator and a rotating operation portion 11 such as a mouse wheel for receiving a rotational operation performed by a finger of the operator. Note that the rotating operation portion 11 is configured to receive a pressing down operation in addition to the rotating operation, and also functions as the pressing down operation portions 10. Also, a signal line 12 for outputting an electrical signal to an external apparatus such as a personal computer is connected to the operation device 1. Note that the method with which the operation device 1 outputs the electrical signal is not limited to wired communication using the signal line 12, and various communication methods such as wireless communication can be used.

A later-described switch 2 is housed inside the operation device 1 for each of the pressing down operation portions 10 and the rotating operation portion 11, and when a pressing down operation is performed on a pressing down operation portion 10, a part inside the pressing down operation portion 10 presses the corresponding switch 2. The switch 2 outputs a signal based on the pressing condition to an electronic apparatus such as an external personal computer through the signal line 12.

That is, the operation device 1 described in the present application includes the pressing down operation portions 10 for receiving a pressing down operation from the outside and the rotating operation portion 11 for receiving an operation such as a rotating operation, and further include the switches 2 therein. Also, the operation device 1 transmits the pressing down operation received by the pressing down operation portions 10 and/or the rotating operation portion 11 to the corresponding switch 2 as pressing performed from the outside, and outputs a signal based on the operation of the switch 2 to an external electronic apparatus.

Switch 2

Figure 2:
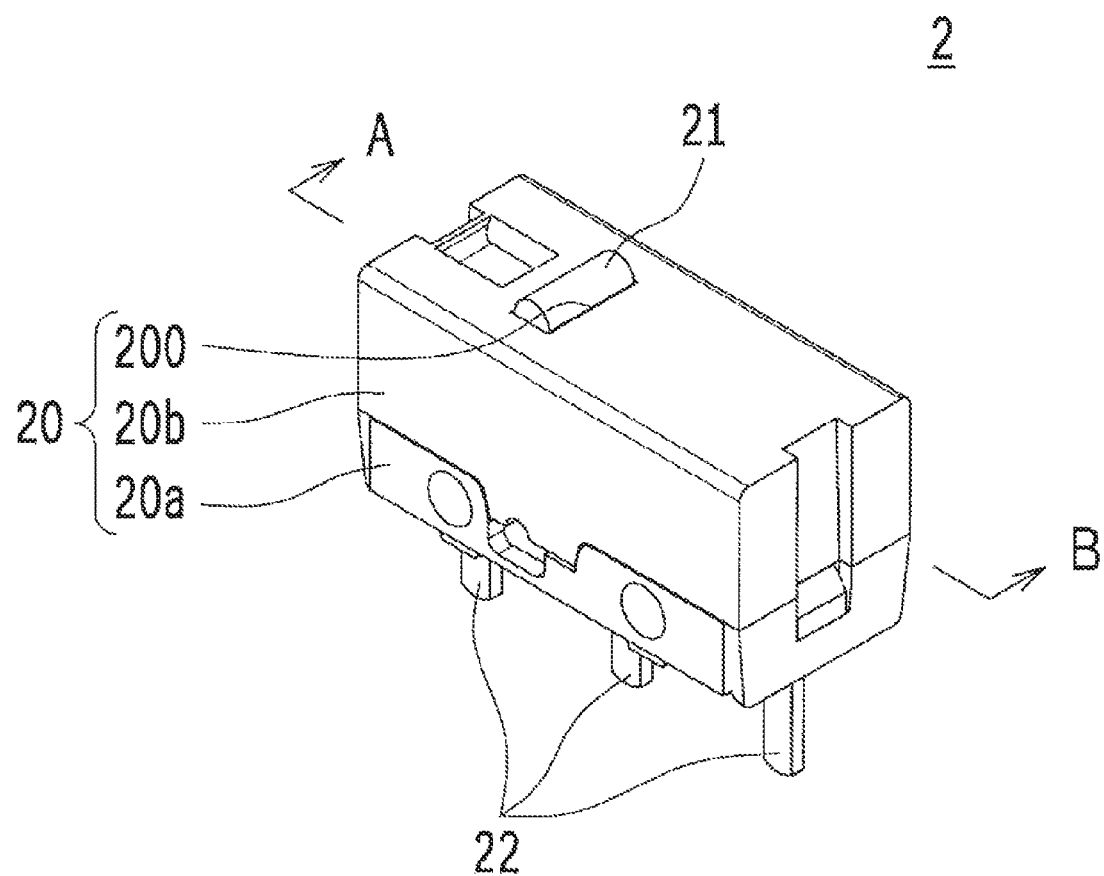
FIG. 2 is a schematic perspective view illustrating one example of an external view of a switch described in the present application.

Next, the switch 2 described in the present application will be described. FIG. 2 is a schematic perspective view illustrating one example of an external view of the switch 2 described in the present application. Note that, in the specification of the present application, the directions of the switch 2 are expressed such that, in a direction toward FIG. 2, the left front side is front, the right back side is rear, the upward is upper, and the downward is lower, these are merely for the convenience of description, and the incorporation direction of the switch 2 is not limited. As described above, the switch 2 is housed inside an electronic apparatus such as the operation device 1 as the micro switch, and receives a pressing down operation received by a part such as the pressing down operation portion 10 of the operation device 1 as pressing from the outside.

The switch 2 includes a casing 20 having a substantially rectangular solid shape. The casing 20 includes a base 20a in a lower portion and a cover 20b in an upper portion. A rectangular insertion hole 200 into which a pressing member 21 is inserted is provided in an upper face of the casing 20 at a position leftward from the center, when viewed from the front. The pressing member 21 inserted into the insertion hole 200 is a member that moves in an up-down direction by receiving a pressing operation from outside the casing 20, and an upper end of the pressing member 21 protrudes from the upper face of the casing 20. Moreover, three connection terminal portions 22 that are metal pieces to which other electrical members can be connected protrude from a lower side of the casing 20.

In the switch 2 formed in this way, the pressing down operation from the outside that has been received by the operation device 1 is transmitted to the pressing member 21 as pressing from the outside of the casing 20. The pressing member 21, upon receiving a pressing force from an outside source, moves downward, and upon the pressing being removed from the outside, moves upward.

Figure 3:
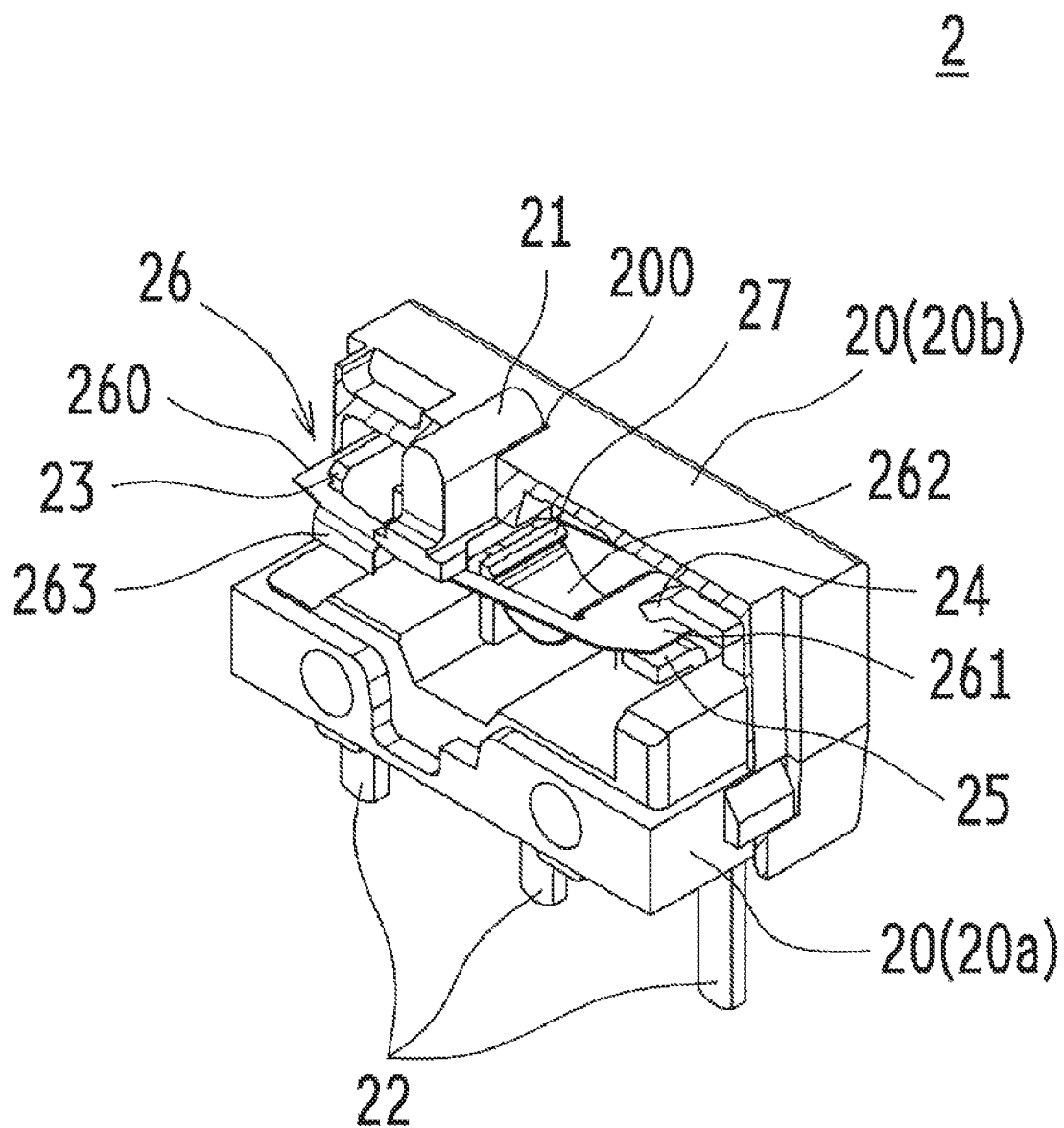
FIG. 3 is a schematic partially cut-off perspective view illustrating one example of the switch described in the present application.
Figure 4:
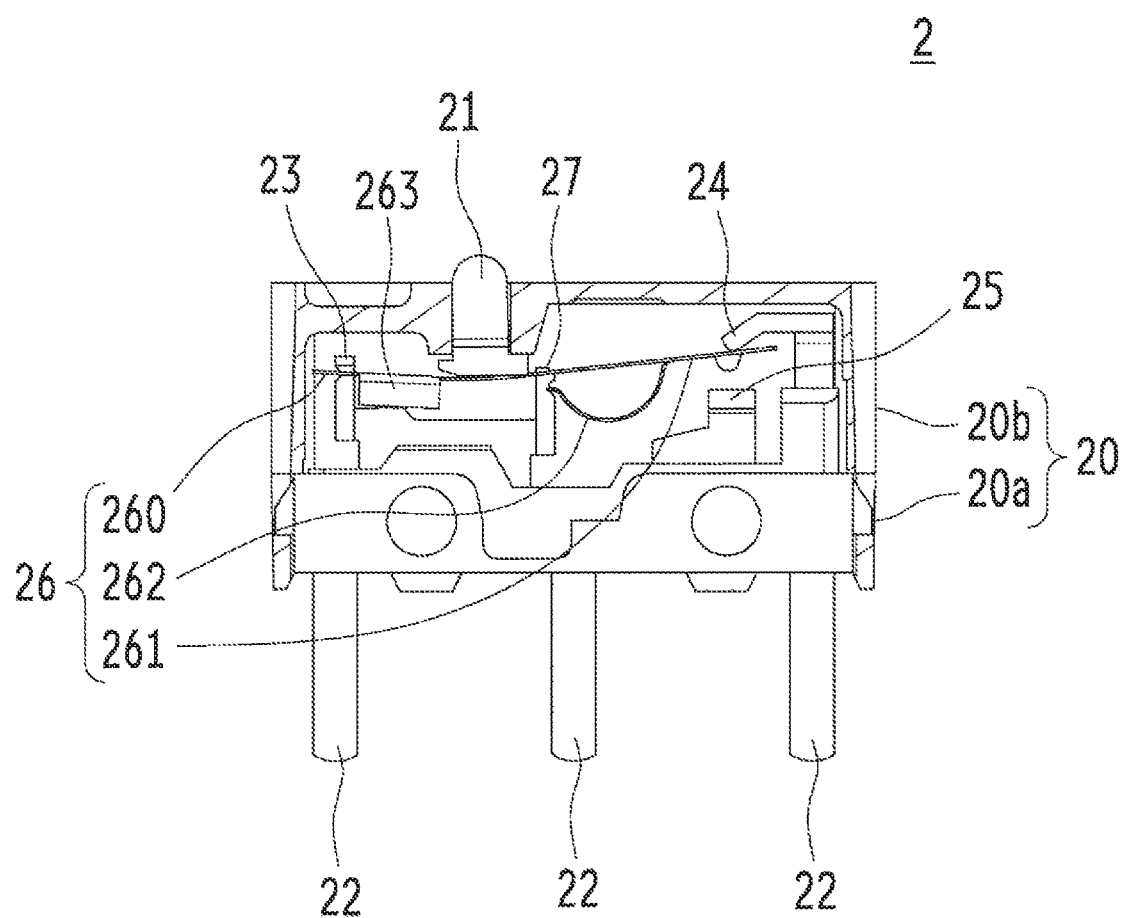
FIG. 4 is a schematic partially cut-off front view illustrating one example of the switch described in the present application.

Next, the internal structure of the switch 2 will be described. FIG. 3 is a schematic partially cut-off perspective view illustrating one example of the switch 2 described in the present application. FIG. 4 is a schematic partially cut-off front view illustrating one example of the switch 2 described in the present application. In FIG. 3, an upper front portion of the switch 2 is cut off such that the inside can be viewed. FIG. 4 shows the switch 2 shown in FIG. 3 from a frontal viewpoint.

A region serving as a contact chamber that houses a contact mechanism for opening/closing an electrical circuit is secured inside the casing 20 of the switch 2. An insertion hole 200 that passes through from the outside of the casing 20 is provided in an upper face of the contact chamber, and the pressing member 21 is inserted into the insertion hole 200.

The contact mechanism housed inside the contact chamber will be described. Members such as a common contact terminal 23, a first contact terminal 24, a second contact terminal 25, and a movable member 26 are provided inside the contact chamber as the contact mechanism. The common contact terminal 23 is provided on a left side inside the contact chamber, and is electrically connected to a connection terminal portion 22 on the left side. The first contact terminal 24 is provided on a right upper side inside the contact chamber, and is electrically connected to a connection terminal portion 22 on a right side. The second contact terminal 25 is provided on a right lower side inside the contact chamber, and is electrically connected to a connection terminal portion 22 at the center.

The movable member 26 is a plate-shaped conductive metal member extending in a left-right direction inside the contact chamber, and has flexibility so as to warp when receiving a pressing force by the pressing member 21. The left end (first end) side of the movable member 26 is a fixed end that is locked to the common contact terminal 23 and functions as a swing fulcrum 260. The right end (second end) side of the movable member 26 is a free end that moves between the first contact terminal 24 and the second contact terminal 25, and is a movable contact 261. A biasing portion 262 that is punched out in a tongue shape and folded in an arc shape and functions as a return spring is formed, in the movable member 26, between a pressed part that receives pressing of the pressing member 21 and a right end so as to extend from the right end side toward the center. A leading end of the biasing portion 262 is locked to a locking plate 27 that is formed in the vicinity of the center inside the contact chamber so as to generate a reaction force to resist against the pressing of the pressing member 21, as a return spring. Bent portions 263 that are bent downward, which is a swinging direction, are formed in side portions of the movable member 26. The bent portions 263 are formed by downwardly folding protruding pieces that expand in a rectangular shape from both sides (front-back direction in the drawing) of the opposing side portions of the movable member 26.

In the contact mechanism constituted in this way, the pressing member 21 moves downward by receiving a pressing force from an outside source, and presses down the movable member 26. As a result of the movable member 26 being pressed down, the right end side of the movable member 26, which is a free end thereof, moves downward, and the movable contact 261 comes into contact with the second contact terminal 25. With this, the connection terminal portion 22 on the left side that is connected to the common contact terminal 23 and the connection terminal portion 22 at the center that is connected to the second contact terminal 25 enter a conductive state.

When the pressing of the pressing member 21 is removed, the movable member 26 is biased upward due to the reaction force of the biasing portion 262. As a result of the movable member 26 being biased upward, the pressing member 21 moves upward. Also, as a result of the movable member 26 being biased upward by the biasing portion 262, the movable contact 261 positioned on the right end side of the movable member 26 moves upward, and comes into contact with the first contact terminal 24. With this, the connection terminal portion 22 on the left side that is connected to the common contact terminal 23 and the connection terminal portion 22 on the right side that is connected to the first contact terminal 24 enter a conductive state.

Figure 5A:
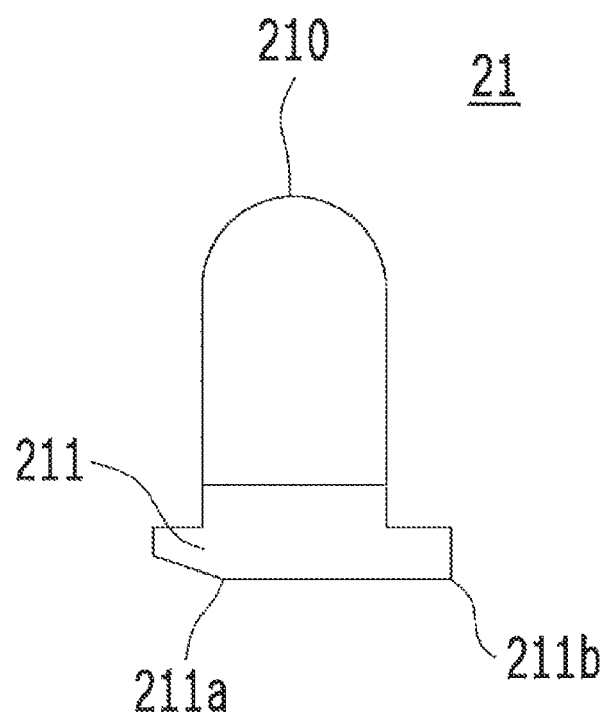
FIG. 5A is a schematic external view illustrating one example of a pressing member included in the switch described in the present application.
Figure 5B:
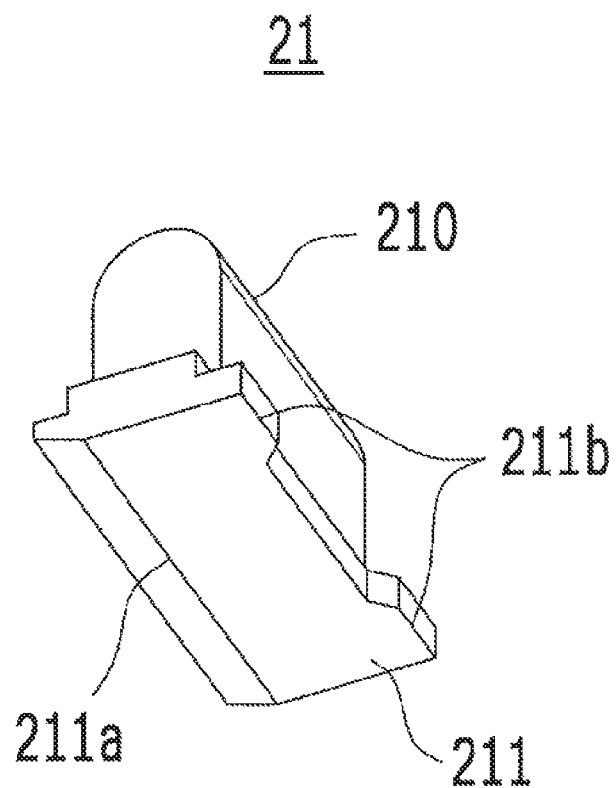
FIG. 5B is a schematic external view illustrating one example of a pressing member included in the switch described in the present application.

The shapes of the pressing member 21 and the movable member 26 will further be described. FIGS. 5A and 5B are schematic external views illustrating one example of the pressing member 21 included in the switch 2 described in the present application. FIG. 5A is a schematic front view, and FIG. 5B is a schematic perspective view from an obliquely downward viewpoint. The pressing member 21 is constituted by a pressed protrusion 210 on an upper side and a pressing plate 211 on a lower side. The pressed protrusion 210 of the pressing member 21 has a substantially rectangular solid shape, and the upper end thereof is formed as a semicircular curved face viewed from the front. The upper portion of the pressed protrusion 210 protrudes from the insertion hole 200 of the casing 20, and receives pressing from the outside. The pressing plate 211 has a substantially rectangular shape in a plan view, and a lower face that opposes the movable member 26 is formed in a substantially planar shape. The left end of the lower face of the pressing plate 211 is formed in a tapered shape so as to incline upward, and a first ridge 211a, which is a boundary between a planar portion and a tapered portion linearly extends in a front-back direction. A part that comes into contact with the movable member 26, in a second ridge 211b on a right end side of the lower face of the pressing plate 211, is a part whose front end and rear end slightly protrude rightward. The pressing member 21, in a process of pressing the movable member 26, comes into contact with the movable member 26 at a plurality of positions including at least the first ridge 211a and the second ridge 211b.

Figure 6A:
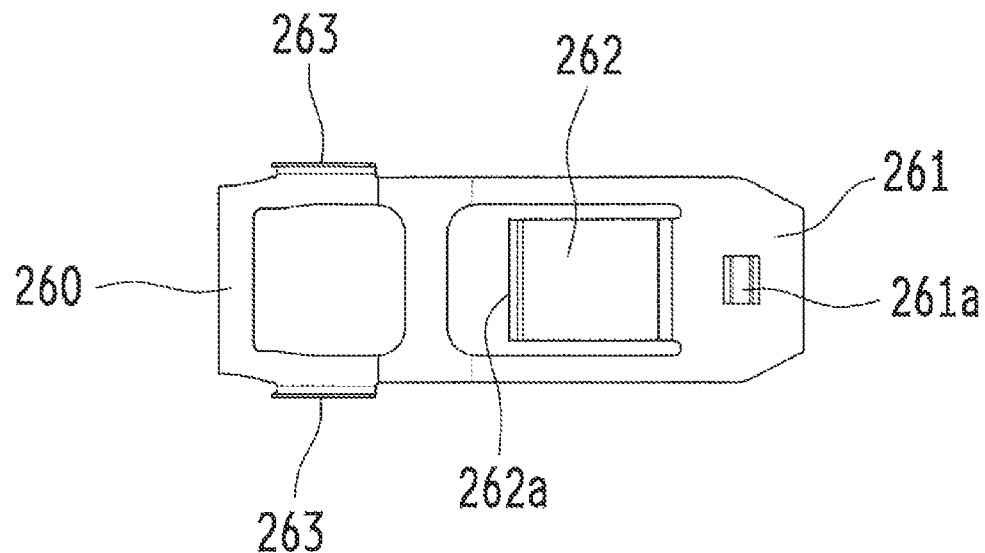
FIG. 6A is a schematic external view illustrating one example of a movable member included in the switch described in the present application.
Figure 6B:
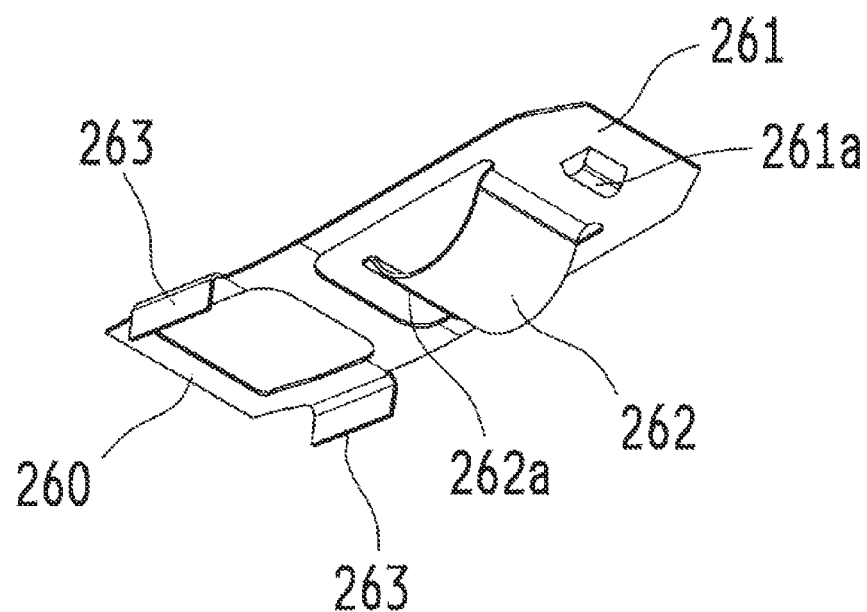
FIG. 6B is a schematic external view illustrating one example of a movable member included in the switch described in the present application.

FIGS. 6A and 6B are schematic external views illustrating one example of the movable member 26 included in the switch 2 described in the present application. FIG. 6A is a schematic plan view, and FIG. 6B is a schematic perspective view from an obliquely downward viewpoint. The movable member 26 is a member having flexibility that is formed by a thin metal plate. The movable member 26 has a substantially rectangular shape in a plan view, the right end portion to be a free end is formed as the movable contact 261, and a protruding contact protrusion 261a is provided on a lower face side of the movable contact 261. The biasing portion 262 described above is formed from the left of the movable contact 261 to the vicinity of the center. The biasing portion 262 is formed by a punched-out portion extending from the right side to the left side in a band shape being folded in an arc shape protruding downward so as to function as a return spring. The leading end of the biasing portion 262 is a locking portion 262a to be locked to the protruding locking plate 27 that is provided in the base 20a of the casing 20, and the biasing portion 262 causes the movable contact 261 side on the right side to swing with the locking portion 262a that is locked to the locking plate 27 being the swing axis. Also, a punched-out opening is formed in a substantially rectangular shape from the left end side to the vicinity of the center. A portion in the vicinity of the center between the right side opening resulted from forming the biasing portion 262 and the left side opening is a pressed part that receives pressing from the pressing member 21. In the movable member 26, bent portions 263 that are bent downward, which is a swinging direction, are formed in side portions in the vicinity of the formed left side opening. The bent portions 263 are formed by downwardly folding protruding pieces expanding in a rectangular shape from two opposing sides of the side portions of the movable member 26. The bent portions 263 are formed between the pressed part that receives pressing of the pressing member 21 and the left end, in the movable member 26, and makes the left end side of the movable member 26 not easily warp with respect to the pressing from the pressing member 21 so as to generate a tactile feeling of resisting against the pressing.

Operation of Switch 2

The operation of the switch 2 described in the present application that is configured as described above will be described. FIGS. 7 to 10 are schematic cross-sectional views illustrating one example of the operation of the switch 2 described in the present application. FIGS. 7 to 10 illustrate cross sections cut by a vertical plane including a line A-B shown in FIG. 2 viewed from a frontal viewpoint.

Figure 7:
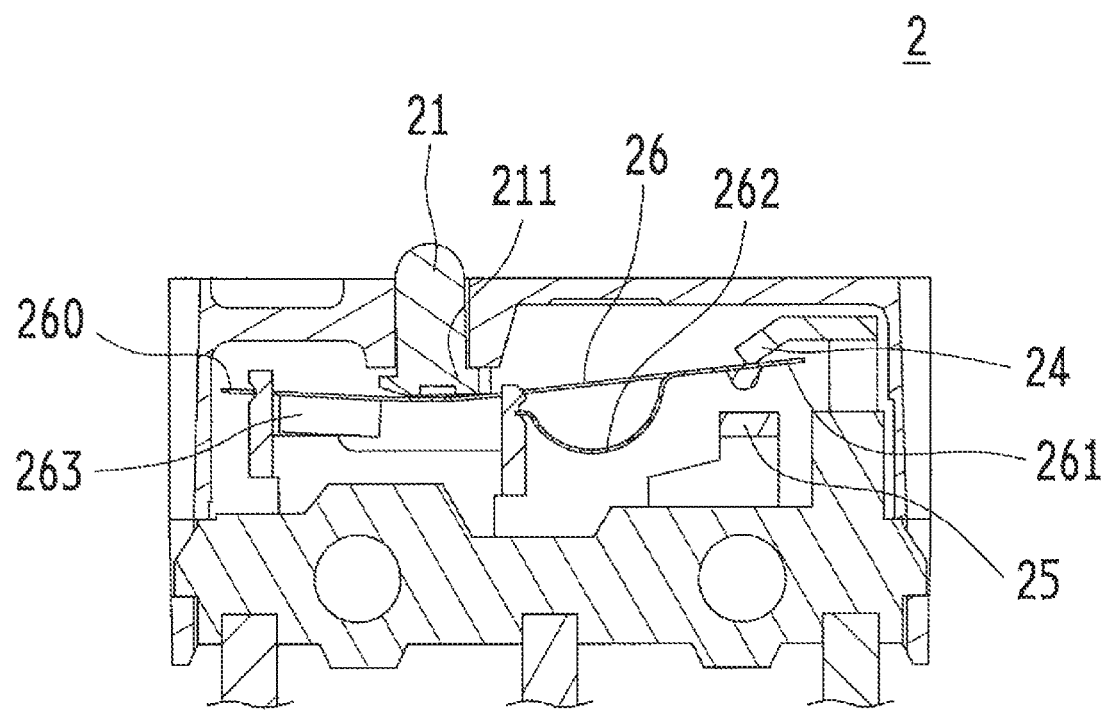
FIG. 7 is a schematic cross-sectional view illustrating one example of an operation of the switch described in the present application.

FIG. 7 illustrates a state in which the pressing member 21 is not receiving a pressing force from an outside source. The lower end of the pressing member 21 is in contact with the movable member 26 with the lower face of the pressing plate 211 in the lower portion, at a part between the swing fulcrum 260 to which the left end of the movable member 26 is locked and a position at which the locking portion 262a at the leading end of the biasing portion 262 of the movable member 26 is locked. In the state illustrated in FIG. 7, the movable member 26 is pushed upward by the reaction force resisting against the pressing of the pressing member 21 that is exerted by the biasing portion 262 that is positioned between the pressed part that receives pressing of the pressing member 21 and the movable contact 261, and therefore the free end formed as the movable contact 261 is brought into contact with the first contact terminal 24 provided on the upper right side inside the contact chamber.

Figure 8:
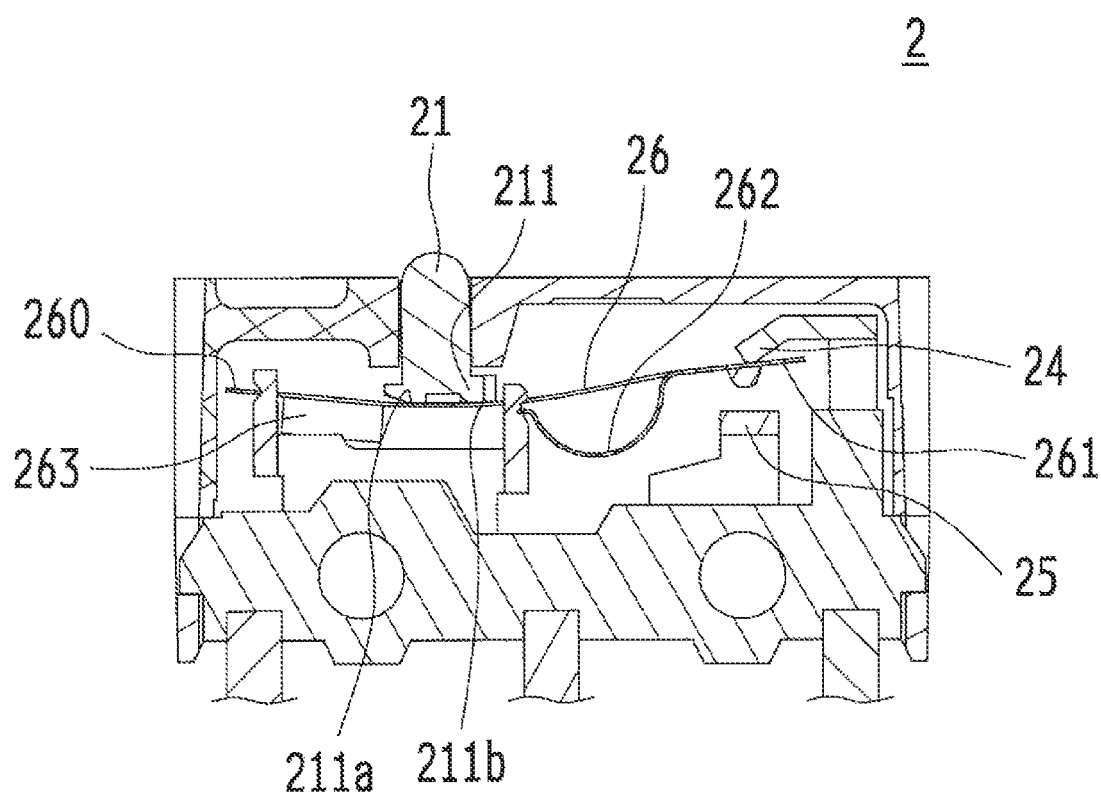
FIG. 8 is a schematic cross-sectional view illustrating one example of an operation of the switch described in the present application.

FIG. 8 illustrates a state in which the pressing member 21 has moved downward from the state illustrated in FIG. 7 by receiving a pressing force from an outside source. As a result of the pressing member 21 moving downward, the pressing plate 211 that is positioned in the lower portion of the pressing member 21 presses the movable member 26 downward. The pressing member 21 comes into contact with the movable member 26 at two points, namely the first ridge 211a and the second ridge 211b of the pressing plate 211. The entirety of the movable member 26 is pressed by the pressing member 21, and tries to move downward with the swing fulcrum 260 being the swing axis. However, the movable member 26 is pushed upward by a reaction force resisting against the pressing of the pressing member 21 that is exerted by the biasing portion 262 positioned between the pressed part that receives pressing of the pressing member 21 and the movable contact 261, and therefore the movable contact 261 is kept in a state of being in contact with the first contact terminal 24 provided on the upper right side inside the contact chamber. Therefore, the movable member 26 is bent downward by receiving a pressing force from the pressing member 21, and enters a warped state.

Figure 9:
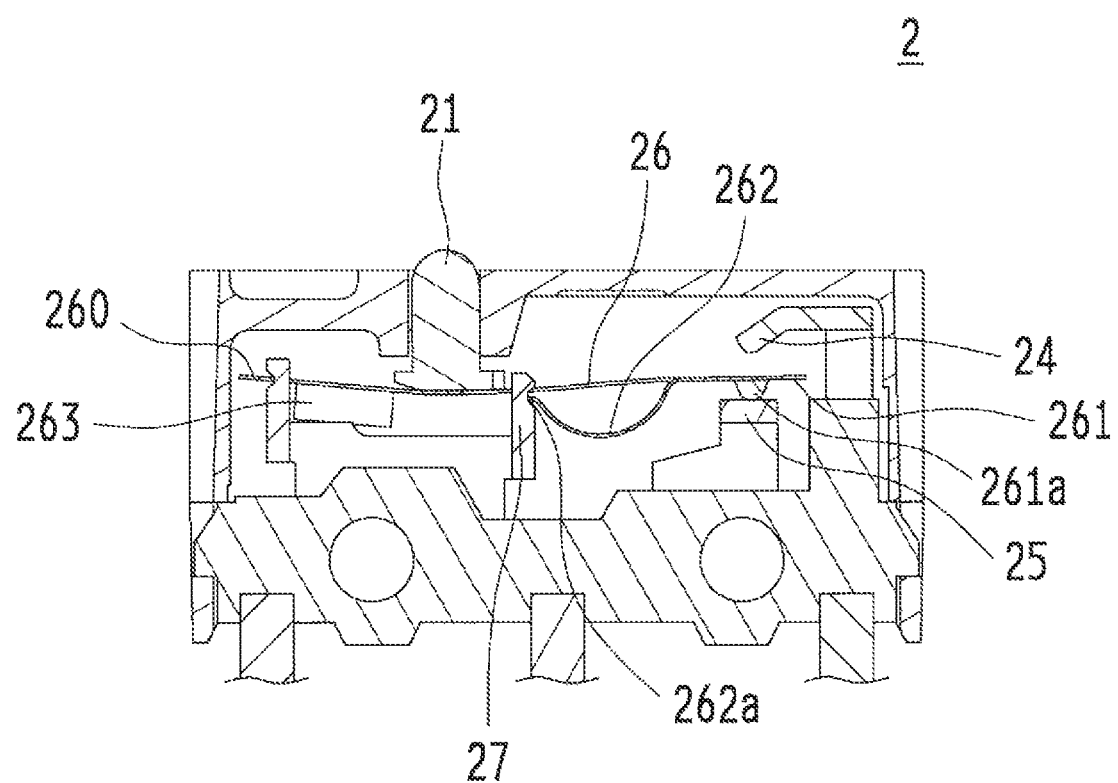
FIG. 9 is a schematic cross-sectional view illustrating one example of an operation of the switch described in the present application.

FIG. 9 illustrates a state in which the pressing member 21 has moved downward from the state illustrated in FIG. 8 by receiving further pressing from the outside. As a result of the pressing member 21 moving further downward, the entirety of the movable member 26 is pressed by the pressing member 21, and tries to move downward with the swing fulcrum 260 being the swing axis. Also, the biasing portion 262 of the movable member 26 swings downward with the locking portion 262a locked to the locking plate 27 being the swing axis, and therefore the entirety of the movable member 26 swings with the swing fulcrum 260 being the swing axis so as to turn over. Therefore, the contact protrusion 261a of the movable contact 261 comes into contact with the second contact terminal 25 provided as a fixed contact on the lower right side inside the contact chamber. With this, the connection terminal portion 22 on the left side that is connected to the common contact terminal 23 and the connection terminal portion 22 at the center that is connected to the second contact terminal 25 enter a conductive state.

Figure 10:
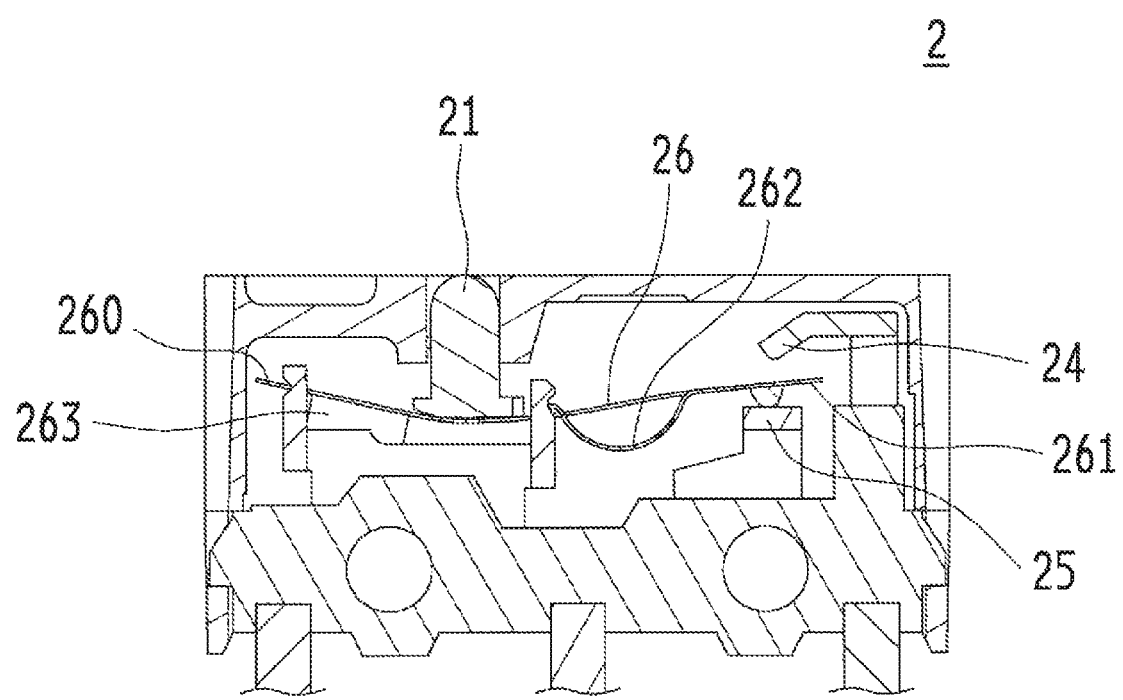
FIG. 10 is a schematic cross-sectional view illustrating one example of an operation of the switch described in the present application.

FIG. 10 illustrates a state in which the pressing member 21 has moved to the lowest point in a movable range from the state illustrated in FIG. 9 by receiving further pressing from the outside. As a result of the pressing member 21 moving to the lowest point, the entirety of the movable member 26 is pressed by the pressing member 21, and tries to move downward with the swing fulcrum 260 being the swing axis. Therefore, the movable member 26 is bent so as to warp downward while being supported by the swing fulcrum 260 and the movable contact 261 at the both ends. However, the conductive state does not change.

When the pressing of the pressing member 21 is removed, the movable member 26 is biased upward by the reaction force of the biasing portion 262. As a result of the movable member 26 being biased upward, the pressing member 21 moves upward. Also, as a result of the movable member 26 being biased upward by the biasing portion 262, the movable contact 261, which is the free end of the movable member 26 moves upward and comes into contact with the first contact terminal 24. That is, the state illustrated in FIG. 7 is achieved.

As described using FIGS. 7 to 10, as an example, the movable member 26 swings while warping by receiving a pressing force by the pressing member 21. The bent portions 263 resist against the force of the movable member 26 to warp, and therefore a large force is exerted by the bent portions 263 in a process in which the movable member 26 tries to warp and in a process of turning over as a result of the warp being released. The force exerted by the bent portions 263 when resisting warping is transmitted to an operator as a tactile feeling resisting against pressing, and therefore the operator can have strong click feeling.

Figure 11A:
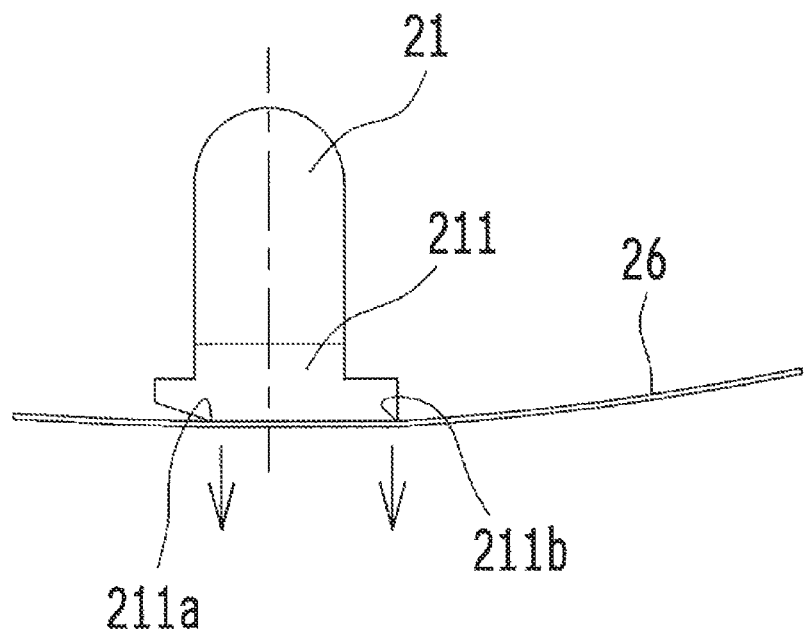
FIG. 11A is a diagram schematically illustrating one example of a kinetic model relating to the pressing member and the movable member that are included in the switch described in the present application.
Figure 11B:
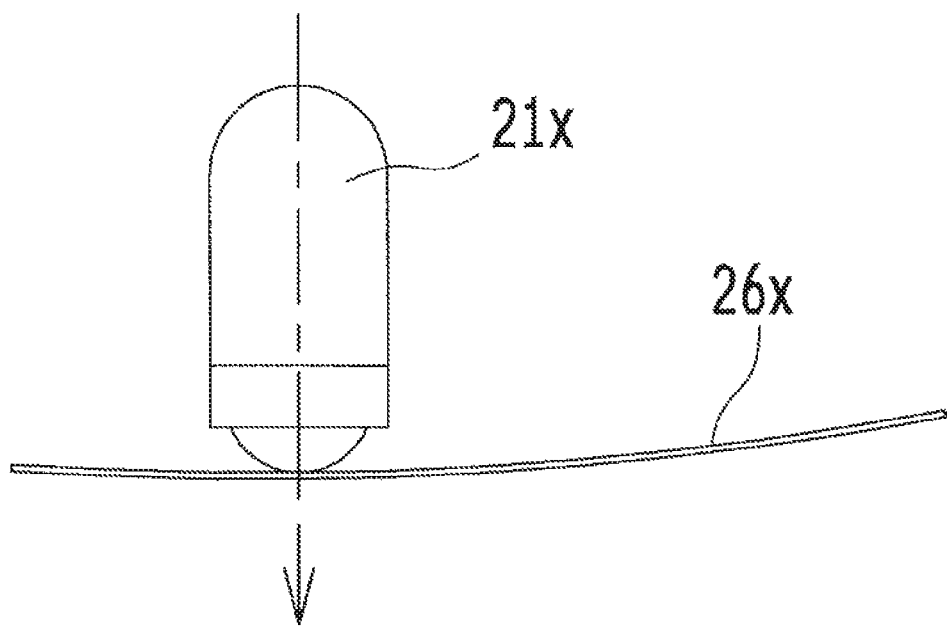
FIG. 11B is a diagram schematically illustrating one example of a kinetic model relating to a pressing member and a movable member that are included in a known switch.

Next, the sound reduction effect based on the shape of the pressing member 21 included in the switch 2 described in the present application will be described. FIG. 11A is a diagram schematically illustrating one example of a kinetic model relating to the pressing member 21 and the movable member 26 that are included in the switch 2 described in the present application. FIG. 11B is a diagram schematically illustrating one example of a kinetic model relating to a pressing member 21x and a movable member 26x that are included in a known switch 2x. FIG. 11A illustrates the pressing member 21 and the movable member 26 viewed from a frontal viewpoint, and FIG. 11B illustrates the known switch 2x from a similar viewpoint for comparison. In FIGS. 11A and 11B, the one dot chain lines indicates the center of the force of pressing the movable members 26 and 26x by receiving a pressing force from an outside source, and the arrows indicate forces that the pressing members 21 and 21x apply to the movable member 26 and 26x.

As illustrated in FIG. 11A, the lower face of the pressing plate 211 formed in the lower portion of the pressing member 21 included in the switch 2 described in the present application is formed in a substantially planar shape. The movable member 26 warps by being pressed by the pressing member 21, and is bent downward, and therefore the pressing member 21 comes into contact with the movable member 26 at two contact parts, namely the first ridge 211a and the second ridge 211b. That is, the pressing member 21 includes contact parts, namely the first ridge 211a that is on the swing fulcrum 260 side and the second ridge 211b that is on the movable contact 261 side, relative to the center of the force of pressing the movable member 26 by receiving a pressing force from an outside source. Also, the pressing member 21 presses the movable member 26 at the two contact parts indicated by the arrows in the drawing. Note that, in the known switch 2x shown in FIG. 11B for comparison, the lower portion of the pressing member 21x is formed in an arc shape protruding downward, and the pressing member 21x comes into contact with the movable member 26x at one contact part that substantially matches the center of the pressing force, and presses the movable member 26x at the one contact part indicated by the arrow in the drawing.

Figure 12:
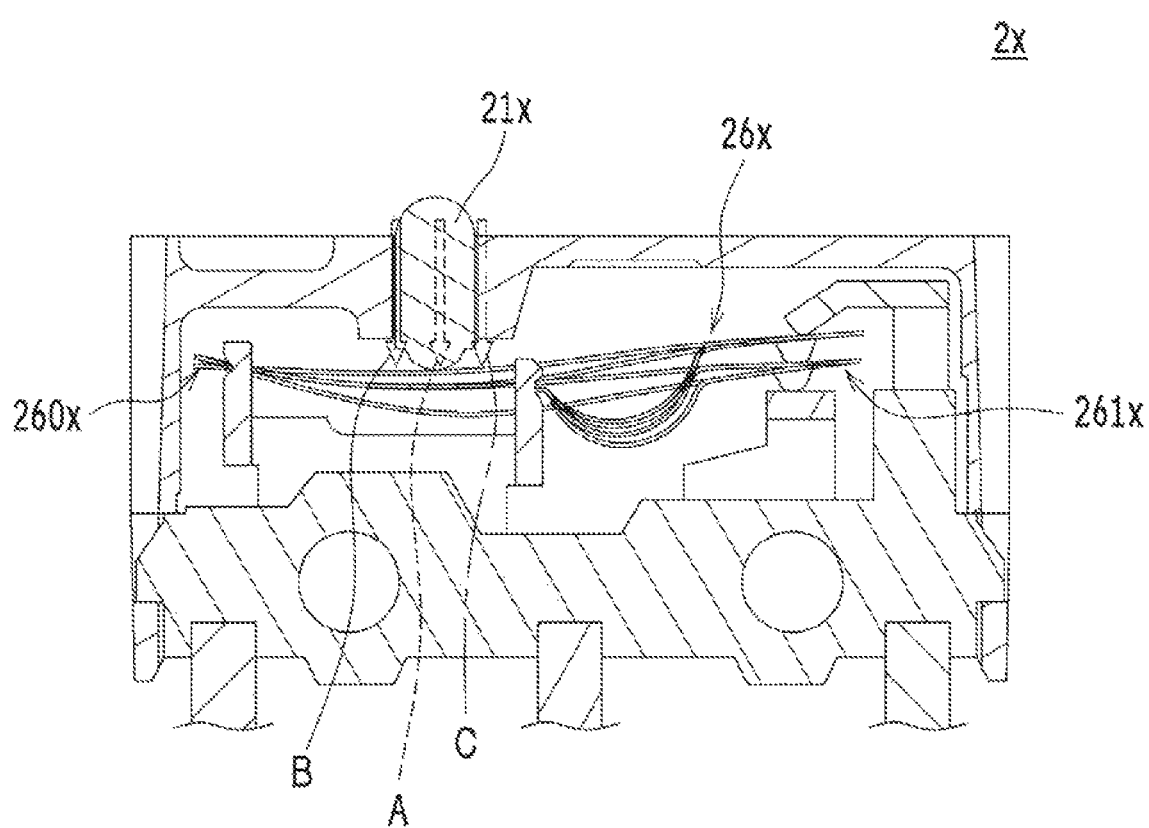
FIG. 12 is a diagram schematically illustrating one example of the kinetic model of the known switch.
Figure 13A:
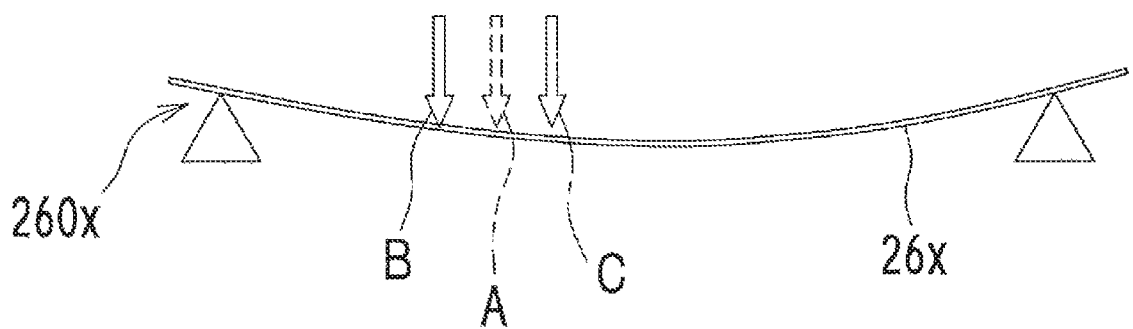
FIG. 13A is a diagram schematically illustrating, as a kinetic model, the relationship between a load and the movable member.
Figure 13B:
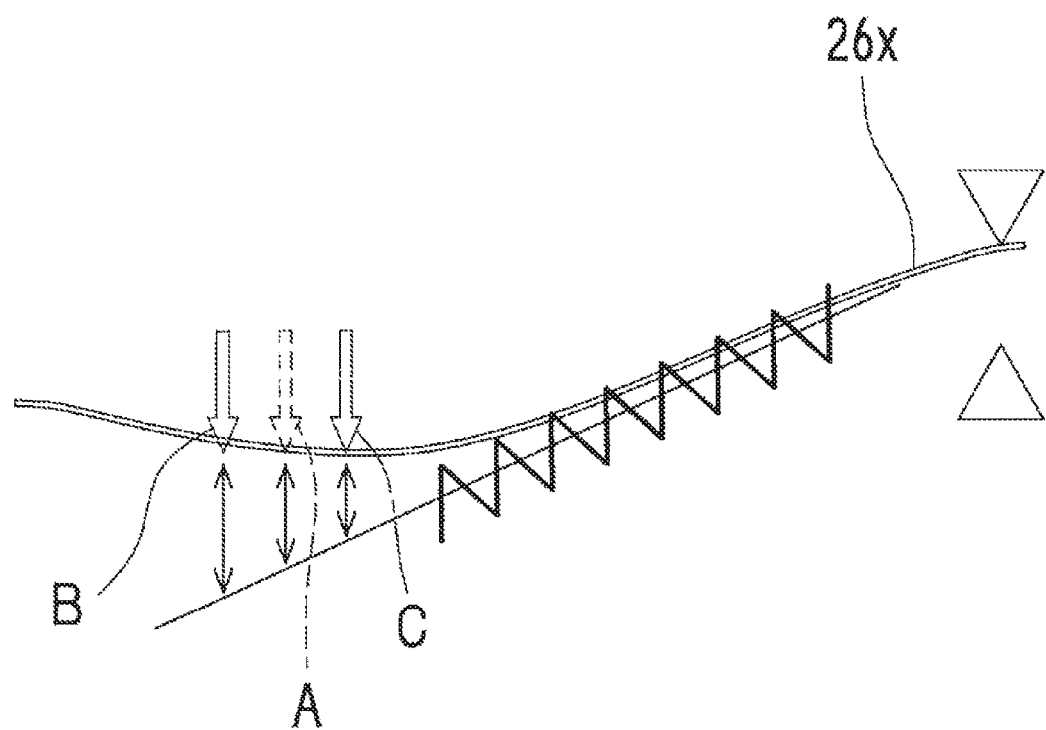
FIG. 13B is a diagram schematically illustrating, as a kinetic model, the relationship between a load and the movable member.
Figure 14:
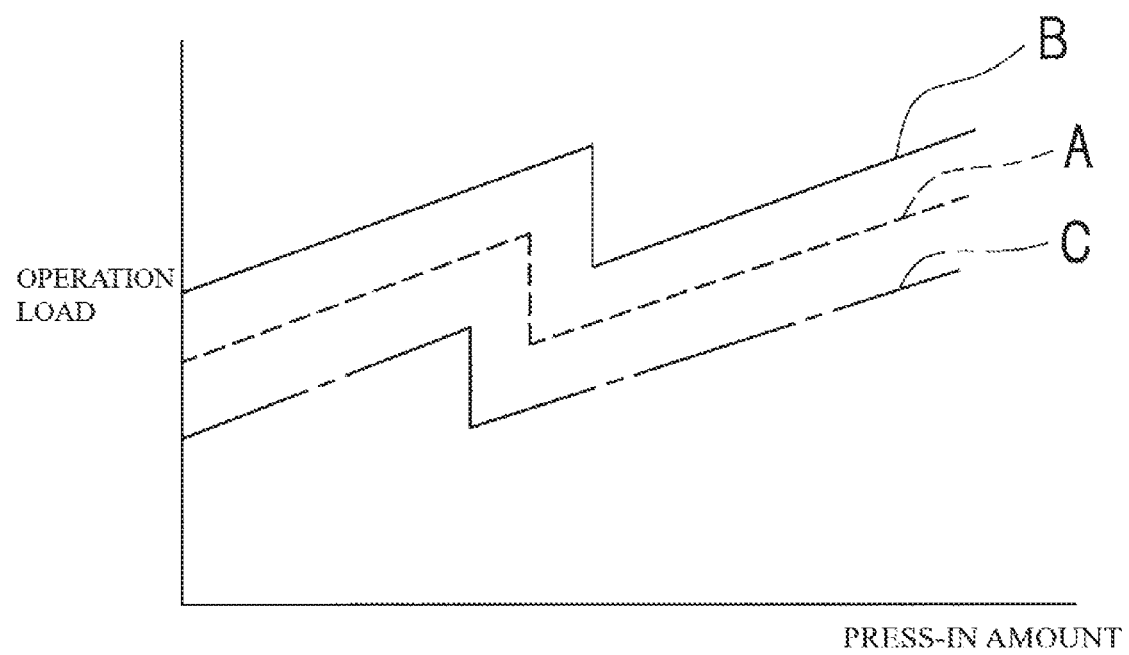
FIG. 14 is a graph schematically illustrating, as a kinetic model, the relationship between a press-in amount and an operation load in the known switch.

FIG. 12 is a diagram schematically illustrating one example of the kinetic model of the known switch 2x. FIGS. 13A and 13B are diagrams schematically illustrating the relationship between a load and the movable member 26x, as a kinetic model. FIG. 14 is a graph schematically illustrating, as a kinetic model, the relationship between a press-in amount and an operation load in the known switch 2x. FIG. 12 shows a cross section of the switch 2x cut by a vertical plane viewed from a frontal viewpoint, and the motion of the movable member 26x is illustrated intermittently. FIG. 13A schematically illustrates the relationship between a load on a both ends-supported beam and warping, and FIG. 13B schematically illustrates the timing of a turning over operation. FIG. 14 illustrates the relationship between the press-in amount (operation stroke) of the pressing member 21, which is shown in the horizontal axis, and the operation load received by the pressing member 21x when being pushed down, which is shown in the vertical axis, when the pressing member 21x of the switch 2x is pushed downward.

As shown in FIG. 12, the pressing member 21x is formed to have an arc-shaped lower face, and therefore comes into contact with the movable member 26x at one contact part, in a pushing process. In FIGS. 12, 13A, and 13B, the broken-line open arrows indicate the pressing force when the pressing member 21x comes into contact with the movable member 26x at the position A shown in FIG. 12. Also, in FIG. 14, the broken-line indicates the relationship between a press-in amount and an operation load when the pressing member 21x comes into contact with the movable member 26x at the position A shown in FIG. 12. The solid line open arrows shown in FIGS. 12, 13A, and 13B and the solid line shown in FIG. 14 indicate the pressing force and the relationship when it is assumed that the pressing member 21x comes into contact with the movable member 26x at the position B on the swing fulcrum 260x side (left side toward the drawing) relative to the position A. The one dot chain line open arrows shown in FIGS. 12, 13A, and 13B and the one dot chain line shown in FIG. 14 indicates the pressing force and the relationship when it is assumed that the pressing member 21x comes into contact with the movable member 26x at the position C on the movable contact 261x side (right side toward the drawing) relative to the position A.

FIG. 13A illustrates the relationship between a pressing force and the movable member 26x, regarding the movable member 26x, in which both ends supported beam is assumed. When the both ends supported beam is supposed, the force needed to generate warping of the same size is the largest at the position B close to the swing fulcrum 260x, and decreases in the order of that at the position A and that at the position C. FIG. 13B shows timings of the turnover operation, and the timing regarding the position B close to the swing fulcrum 260x is latest, and becomes earlier in the order of that regarding the position A and that regarding the position C. The graph shown in FIG. 14 can be obtained from these relationships. In FIG. 14, the point at which the operation load rapidly decreases is the position at which the movable member 26x turns over. As shown in FIG. 14, at the turnover position, as the position approaches the swing fulcrum 260x, the load increases and the timing of the turnover operation with respect to the press-in amount is delayed. Also, a large sound is generated at the turnover operation.

Figure 15:
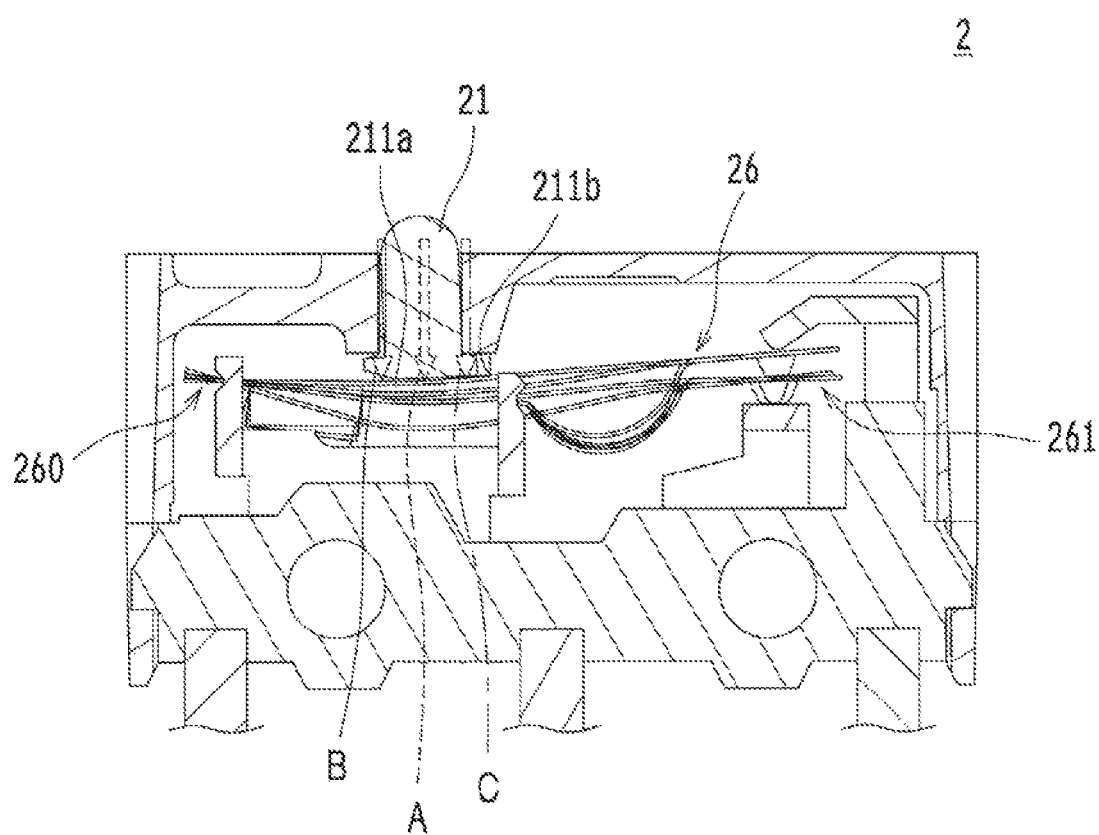
FIG. 15 is a diagram schematically illustrating one example of the kinetic model of the switch described in the present application.

FIG. 15 is a diagram schematically illustrating one example of the kinetic model of the switch 2 described in the present application. In FIG. 15, the broken line, solid line, and one dot chain line open arrows respectively indicate pressing forces when coming into contact with movable member 26 at positions corresponding to the position A, position B, and position C illustrated in FIG. 12, for comparison. As shown in FIG. 15, the pressing member 21 included in the switch 2 described in the present application is formed to have a planar lower face, and therefore comes into contact with the movable member 26 at two contact parts, in the pressing process. That is, in FIG. 15, the pressing member 21 included in the switch 2 described in the present application comes into contact with the movable member 26 and presses the movable member 26 at both of the first ridge 211a (position B) and the second ridge 211b (position C).

Figure 16A:
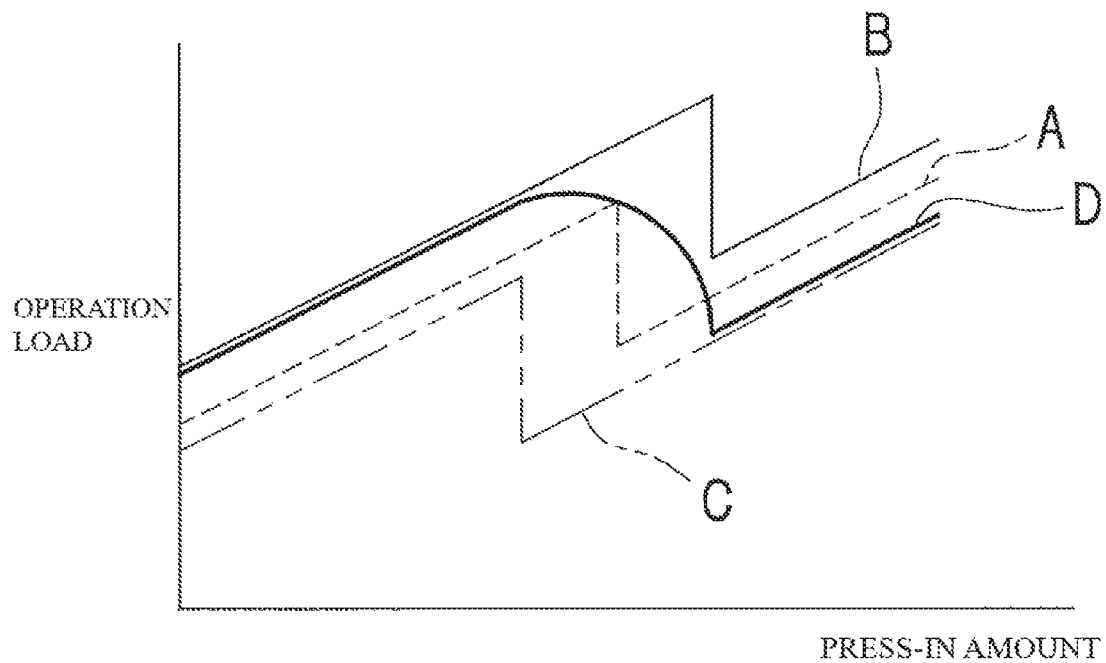
FIG. 16A is a graph schematically illustrating, as a kinetic model, one example of the relationship between a press-in amount and an operation load.
Figure 16B:
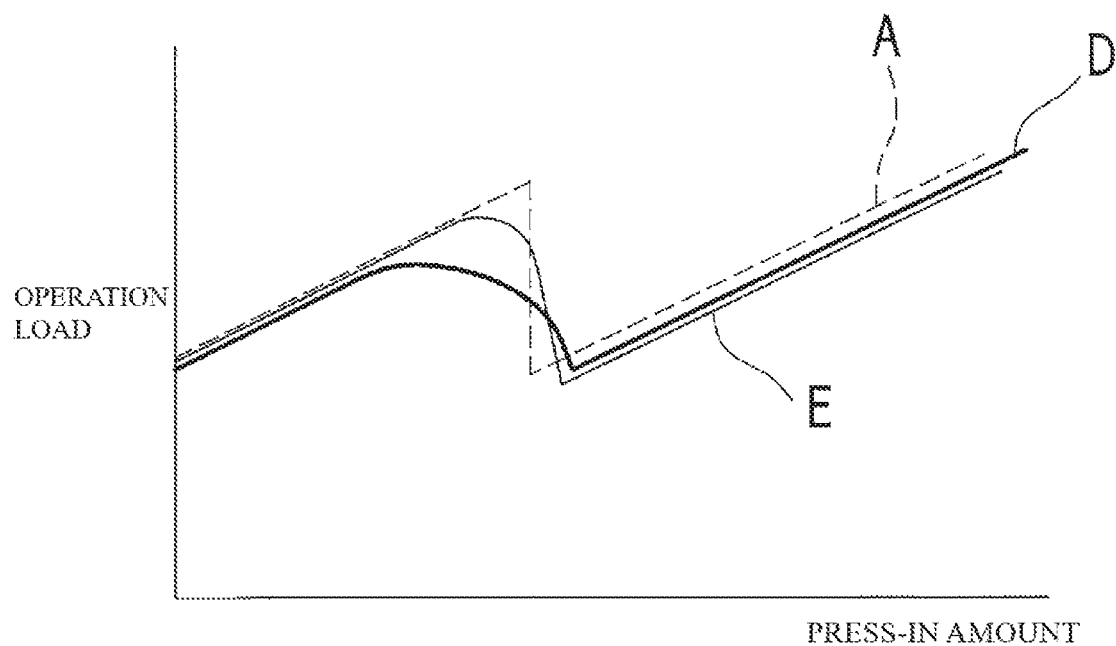
FIG. 16B is a graph schematically illustrating, as a kinetic model, one example of the relationship between the press-in amount and the operation load.

FIGS. 16A and 16B are graphs schematically illustrating, as a kinetic model, one example of the relationship between a press-in amount and an operation load. FIG. 16A is a graph for illustrating a sound reduction effect due to the influence of the pressing member 21, for comparison, and in FIG. 16A, the thick line D shows the relationship between a press-in amount and an operation load regarding the switch 2 using the movable member 26 in which the bent portions 263 are not formed. In FIG. 16A, the broken line A, the thin line B, and the one dot chain line C shows the relationships between a press-in amount and an operation load, at the position A, position B, and position C, respectively, of the switch 2x that uses the pressing member 21x that comes into contact with the movable member 26x at one contact part, and in which the bent portions 263 are not formed in the movable member 26x, as shown in FIG. 14. FIG. 16B is a graph illustrating the change in the operation load due to the influence of the bent portions 263, for comparison, and in FIG. 16B, the thin line E indicates that of the switch 2 described in the present application that uses the movable member 26 in which the bent portions 263 are formed, and uses the pressing member 21 that comes into contact with the movable member 26 at two contact parts. In FIG. 16B, the thin line and broken line show modes using the movable members 26 and 26x in which the bent portions 263 are not formed, for comparison, the thick line D shows a mode of coming into contact with the movable member 26 at two contact parts, and the broken line A shows a mode of coming into contact with the movable member 26x at one contact part.

The line A in FIG. 16B shows a mode in which a known pressing member 21 and movable member 26 are used, and the pressing member 21 comes into contact with the movable member 26 at the position A described above, and the relationship between a press-in amount and a operation load rapidly changes. The line D in FIG. 16B shows a mode of using the pressing member 21 that comes into contact with the movable member 26 at two positions, namely the first ridge 211a (position B) and the second ridge 211b (position C), and the rapid change in the operation load relative to the press-in amount is smoothed relative to the line A and the like, that is, the operation load starts changing at a position substantially similar to that of the line C, and continues to change until the position substantially similar to that of the line B. That is, when the movable member 26 turns over, the switching time from the state of being in contact with the first contact terminal 24 until collision with the second contact terminal 25 increases, and the speed at which the contact protrusion 261a of the movable contact 261 collides with the second contact terminal 25 decreases. As a result of the collision speed of the movable contact 261 decreasing, the shock of collision is softened, and a sound reduction effect can be obtained in which the sound generated due to collision of the contact protrusion 261a, that is, the so-called click sound, can be reduced. Also, because the overall change is smoothed, the click feeling is reduced. The line E in FIG. 16B shows a mode of using the pressing member 21 that comes into contact with the movable member 26 in which the bent portions 263 are formed at two positions, and since the pressing member 21 comes into contact at two positions, the rapid change is suppressed, and a sound reduction effect in which the click sound is reduced can be obtained. However, because the operation load relative to the press-in amount is larger, a strong click feeling can be obtained relative to other modes such as shown as line D.

As described above, in the switch 2 described in the present application, the pressing member 21 comes into contact with the movable member 26 at a plurality of positions, and therefore the sound generation can be suppressed relative to the case of coming into contact with the movable member 26 at one position. Moreover, in the switch 2 described in the present application, the bent portions 263 are formed in the movable member 26, and therefore it is possible to cause the operator to feel sufficient click feeling, while achieving sound reduction.

Figure 17:
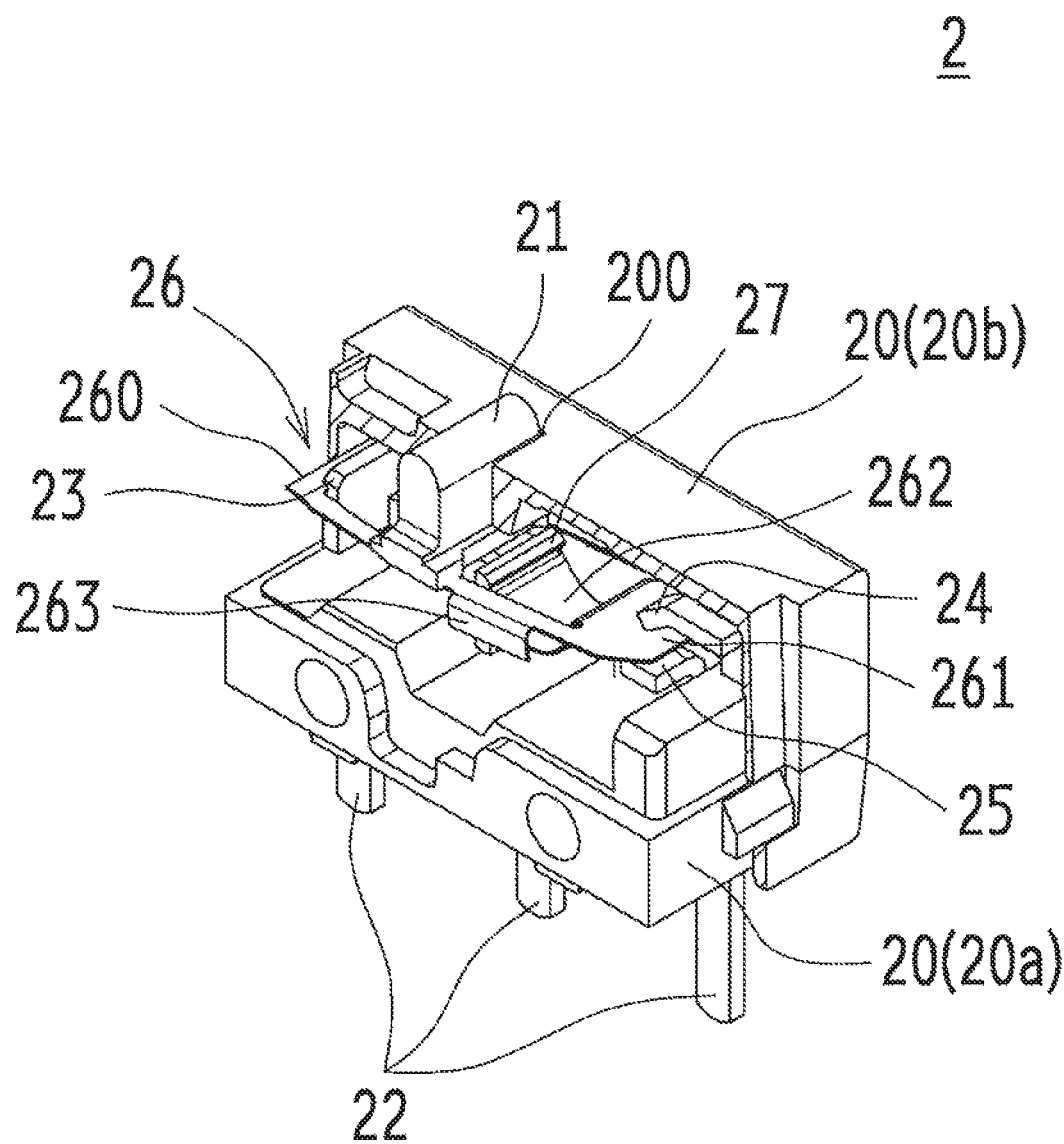
FIG. 17 is a schematic partially cut-off perspective view illustrating one example of the switch described in the present application.
Figure 18:
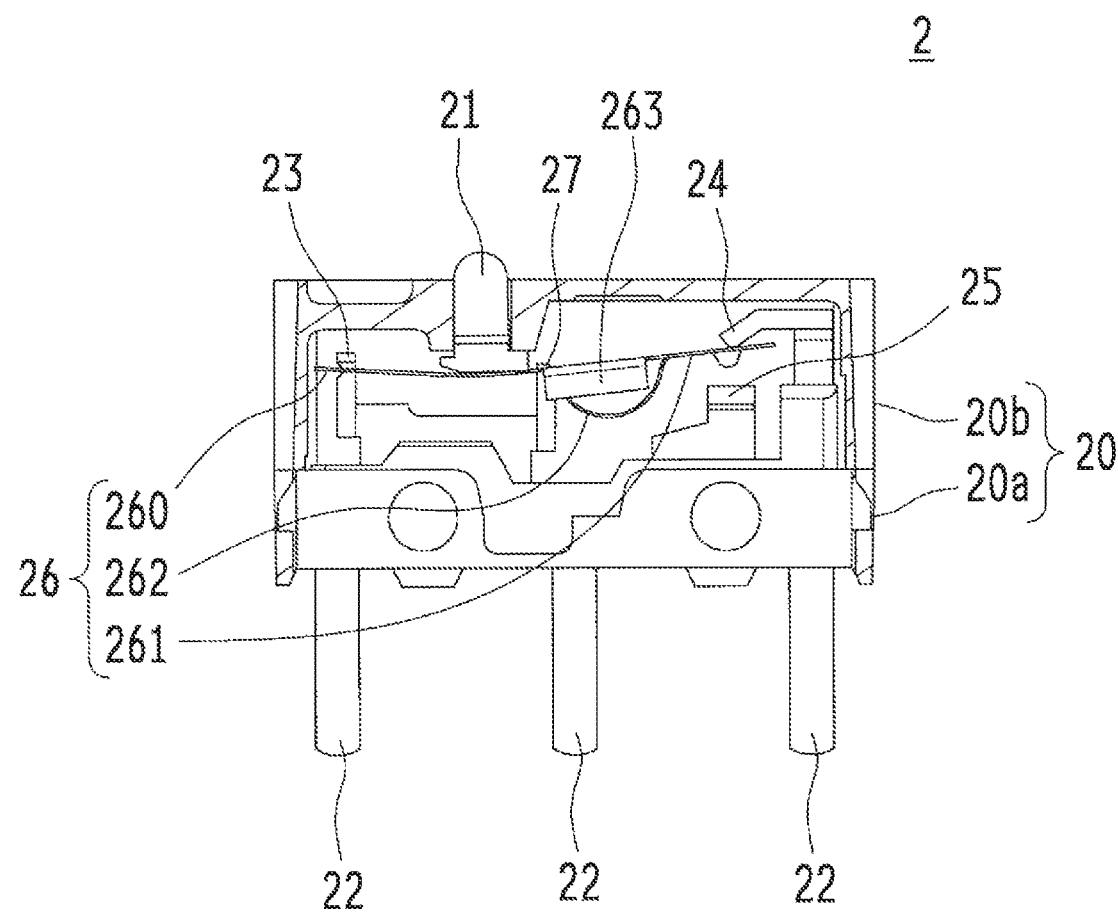
FIG. 18 is a schematic partially cut-off perspective view illustrating one example of the switch described in the present application.
Figure 19A:
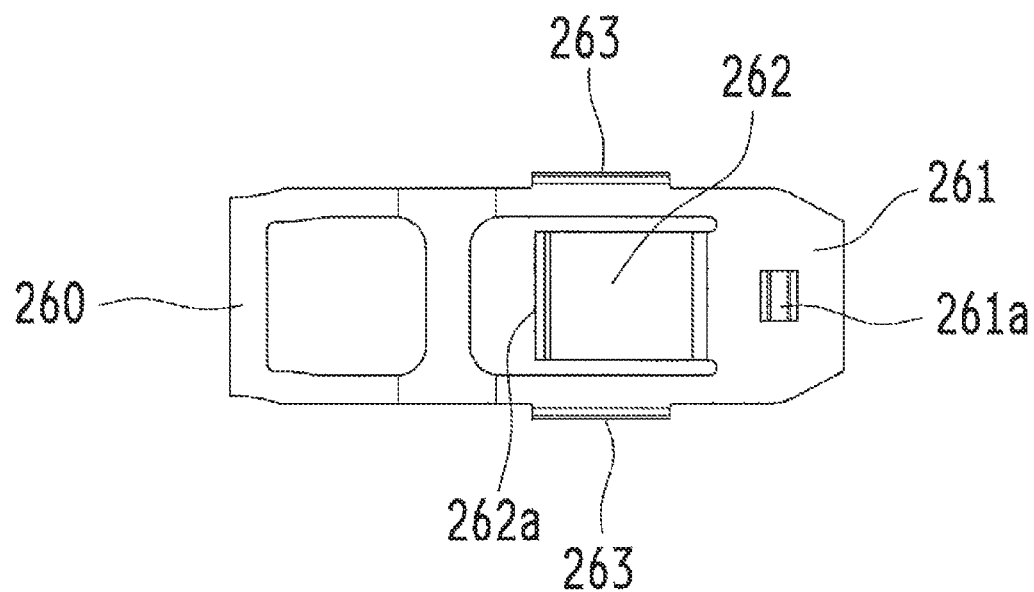
FIG. 19A is a schematic external view illustrating one example of the movable member included in the switch described in the present application.
Figure 19B:
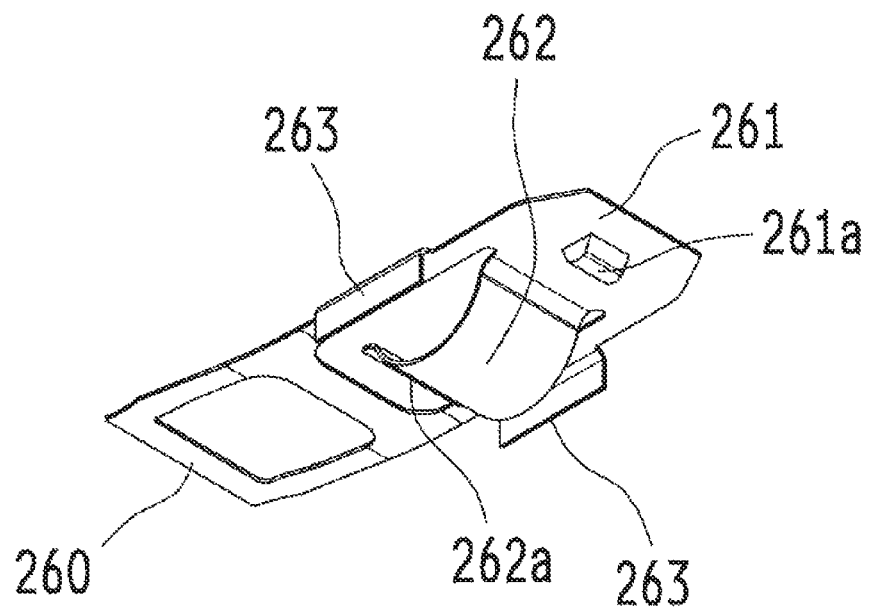
FIG. 19B is a schematic external view illustrating one example of the movable member included in the switch described in the present application.

Note that, in the movable member 26, the position at which the bent portions 263 are formed can be appropriately selected. FIG. 17 is a schematic partially cut-off perspective view illustrating one example of the switch 2 described in the present application. FIG. 18 is a schematic partially cut-off perspective view illustrating one example of the switch 2 described in the present application. In FIG. 17, the inside can be viewed by cutting off a front-upper portion of the switch 2. FIG. 18 shows the switch 2 shown in FIG. 17 from a frontal viewpoint. FIGS. 19A and 19B are schematic external views illustrating one example of the movable member 26 included in the switch 2 described in the present application. In the movable member 26 included in the switch 2 illustrated in FIGS. 17, 18, 19A, and 19B, the bent portions 263 that are bent downward, which is a swinging direction, are formed in side portions in the vicinity of the opening on the right side obtained by forming the biasing portion 262. The bent portions 263 are formed by downwardly folding protruding pieces in a rectangular shape expanding from both sides of opposing side portions of the movable member 26. The bent portions 263 are formed, in the movable member 26, between the pressed part that receives pressing of the pressing member 21 and the right end, make the right end side of the movable member 26 not easily warp with respect to the pressing from the pressing member 21, and generate a tactile feeling resisting against the pressing. As illustrated in FIGS. 17, 18, 19A, and 19B, the positions at which the bent portions 263 are formed can be appropriately designed.

Second Embodiment

A second embodiment is a mode in which, in the first embodiment, sound generation is suppressed using a buffering member, and quietness is improved. Note that, in the following description, the constituent elements similar to those in the first embodiment are given the reference signs similar to those in the first embodiment for referencing to the first embodiment, and the description thereof will be omitted. The external views of an operation device 1 using a switch 2 according to the second embodiment and the switch 2 are similar to those in the first embodiment, and the description thereof will be omitted.

Figure 20:
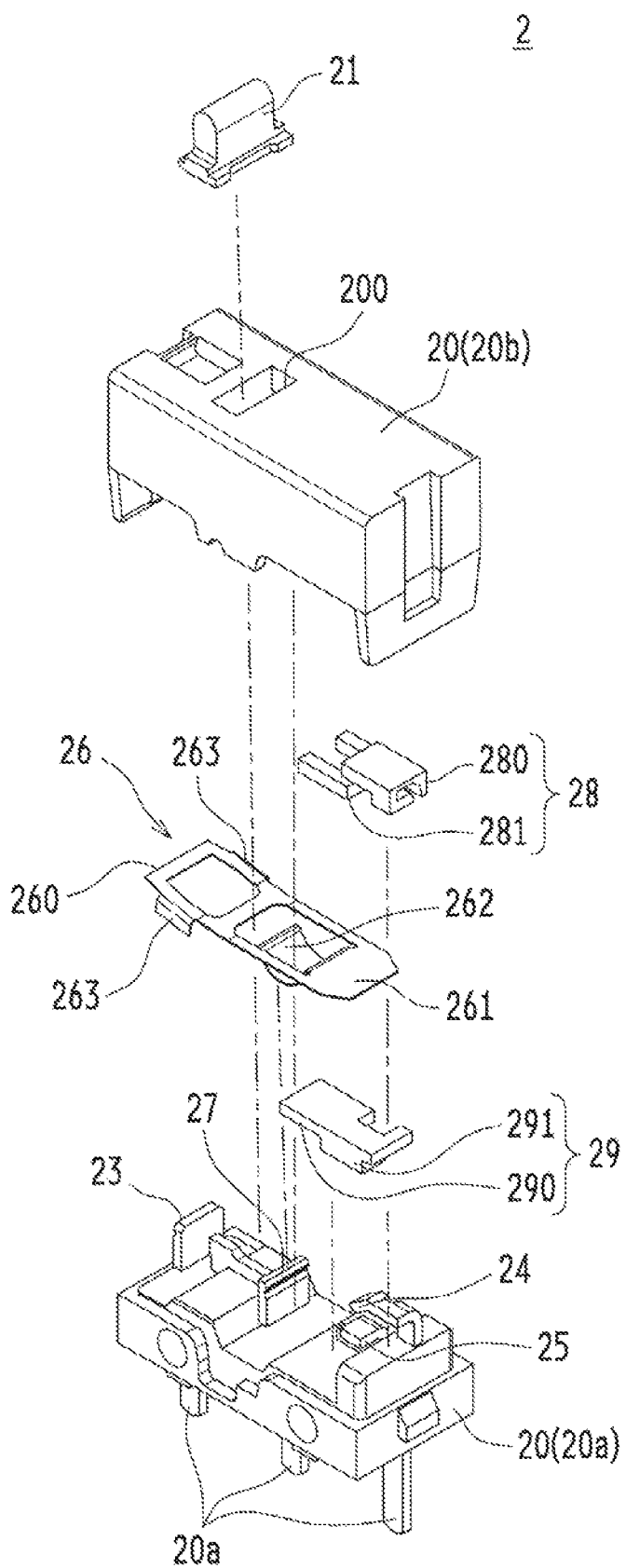
FIG. 20 is a schematic exploded perspective view illustrating one example of the switch described in the present application.
Figure 21:
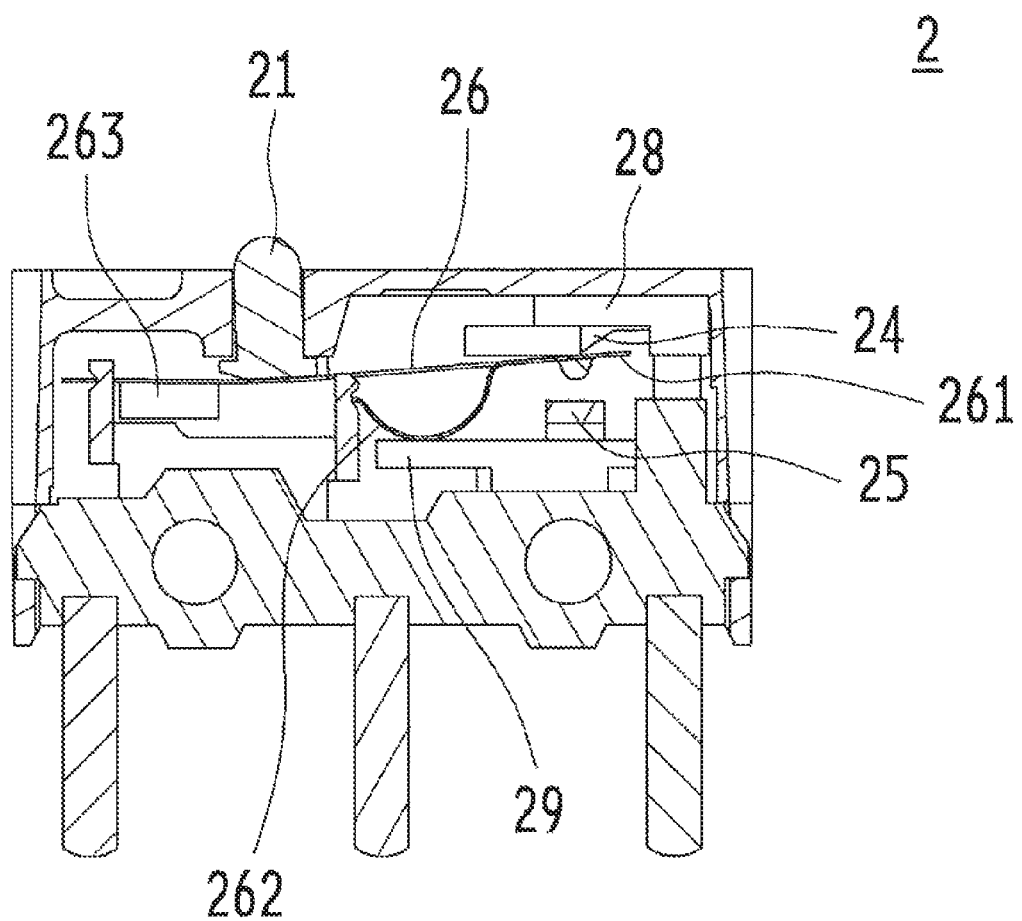
FIG. 21 is a schematic cross-sectional view illustrating one example of the cross section of the switch described in the present application.

The internal structure of the switch 2 according to the second embodiment will be described. FIG. 20 is a schematic exploded perspective view illustrating one example of the switch 2 described in the present application. FIG. 21 is a schematic cross-sectional view illustrating one example of the cross section of the switch 2 described in the present application.

A region serving as a contact chamber is secured inside a casing 20 of the switch 2. An insertion hole 200 that passes through from the outside of the casing 20 is provided in an upper face of the contact chamber, and a pressing member 21 is inserted in the insertion hole 200.

Members such as a common contact terminal 23, a first contact terminal 24, a second contact terminal 25, and a movable member 26, which serve as a contact mechanism, are provided inside the contact chamber.

The movable member 26 is a conductive metal member having flexibility so as to warp when receiving a pressing force by the pressing member 21. The movable member 26 includes parts that serve as a swing fulcrum 260 and a movable contact 261, and a biasing portion 262 and a bent portion 263 are formed therein.

A contact buffering member 28 formed using an elastic material is provided above the first contact terminal 24. The contact buffering member 28 is in contact with the first contact terminal 24 from above. Also, a biasing portion buffering member 29 formed using an elastic material is provided below the biasing portion 262 of the movable member 26. The biasing portion buffering member 29 is in contact with the biasing portion 262 from below.

In the contact mechanism configured in this way, the pressing member 21 moves downward by receiving a pressing force from an outside source, and presses down the movable member 26. As a result of the movable member 26 being pressed down, a right end side of the movable member 26, which is a free end, moves downward, and the movable contact 261 comes into contact with the second contact terminal 25. With this, a connection terminal portion 22 on the left side that is connected to the common contact terminal 23 and a connection terminal portion 22 at the center that is connected to the second contact terminal 25 enter a conductive state.

When the pressing of the pressing member 21 is removed, the movable member 26 is biased upward due to the reaction force of the biasing portion 262. As a result of the movable member 26 being biased upward, the pressing member 21 moves upward. Also, as a result of the movable member 26 being biased upward by the biasing portion 262, the movable contact 261 positioned on the right end side of the movable member 26 moves upward, and comes into contact with the contact buffering member 28. Note that the configuration may be such that when the movable contact 261 of the movable member 26 moves upward, the movable contact 261 comes into contact with the first contact terminal 24 covered by the contact buffering member 28. In this case, the movable member 26 indirectly comes into contact with the contact buffering member 28.

FIGS. 22A and 22B are schematic perspective views illustrating one example of the buffering members included in the switch 2 described in the present application. FIG. 22A shows the contact buffering member 28. The contact buffering member 28 is a member obtained by molding an elastic material such as polyurethane rubber, and is formed by combining an upper portion member 280 and a lower portion member 281. The upper portion member 280 has a substantially rectangular solid shape, and a right end side that is to be brought into contact with an inner wall face of the casing 20 extends downward and is fixed. A slit for fitting the first contact terminal 24 is formed in a part to be fixed. The lower portion member 281 having a substantially U shape in a plan view is attached to a lower face of the upper portion member 280 on a left end side. The contact buffering member 28 formed by the upper portion member 280 and the lower portion member 281 covers the first contact terminal 24, and the movable contact 261, which is a free end of the movable member 26, directly or indirectly through the first contact terminal 24 comes into contact with the lower portion member 281 of the contact buffering member 28.

FIG. 22B shows the biasing portion buffering member 29. The biasing portion buffering member 29 is a member obtained by molding an elastic material such as polyurethane rubber, and has a shape in which a base portion 291 having a substantially rectangular solid shape is formed on a lower face of a plate-shaped body 290 having a substantially rectangular shape in a plan view. A notch is formed on a back side of the plate-shaped body 290 such that the second contact terminal 25 is to be fitted therein. The plate-shaped body 290 is in contact with a lower face of the biasing portion 262 at an upper face thereof on a left end side. The base portion 291 is formed on a right side of the plate-shaped body 290, and therefore the left end side of the plate-shaped body 290 warps, as shown by the arrow in the drawing, by receiving swinging of the biasing portion 262 so as to absorb a shock.

Operation of Switch 2

The operation of the switch 2 described in the present application according to the second embodiment that is configured as described above will be described. FIGS. 23 to 26 are schematic cross-sectional views illustrating one example of the operation of the switch 2 described in the present application.

Figure 23:
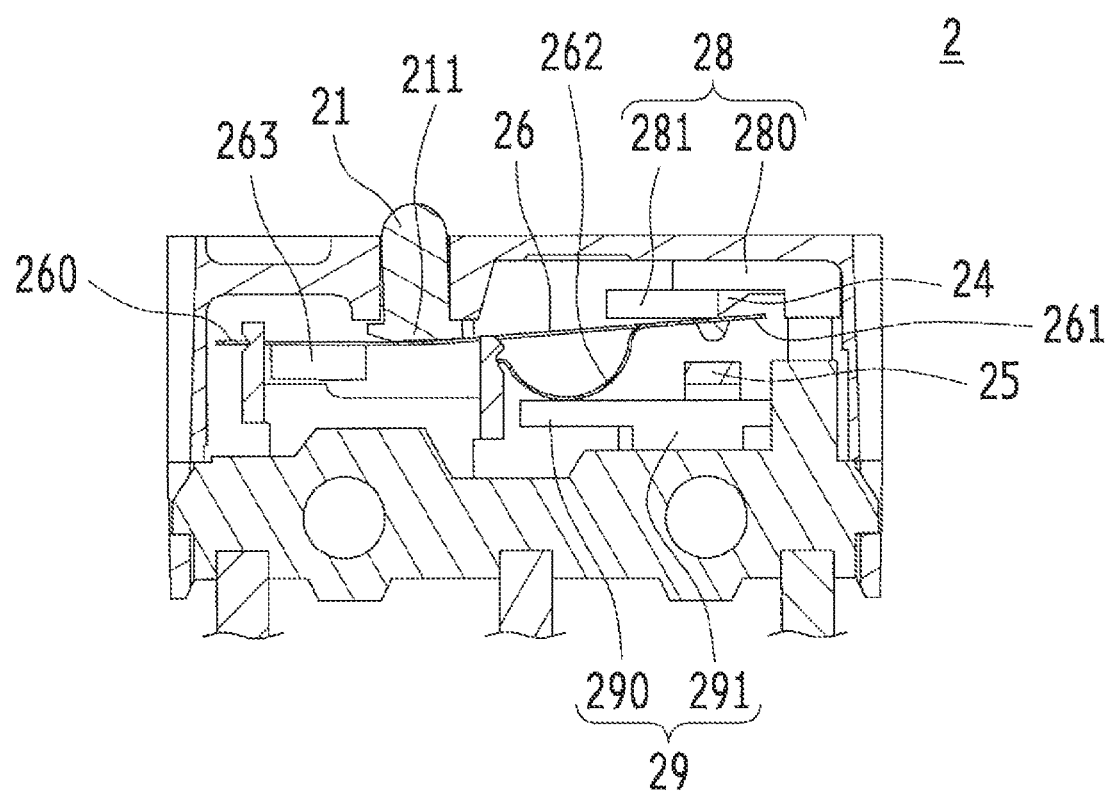
FIG. 23 is a schematic cross-sectional view illustrating one example of an operation of the switch described in the present application.

FIG. 23 shows a state in which the pressing member 21 is not receiving a pressing force from an outside source. A lower end of the pressing member 21 is in contact with the movable member 26, in which a lower face of the pressing plate 211 in a lower portion is in contact with a part between the swing fulcrum 260 to which the left end of the movable member 26 is locked and a position to which a locking portion 262a at the leading end of the biasing portion 262 of the movable member 26 is locked. In the state shown in FIG. 23, the movable member 26 is pushed upward by a reaction force resisting against the pressing of the pressing member 21 that is exerted by the biasing portion 262 that is positioned between a pressed part that receives pressing of the pressing member 21 and the movable contact 261, and therefore the free end side, which is formed as the movable contact 261, is in contact with the contact buffering member 28 that is provided on a right upper side inside the contact chamber.

Figure 24:
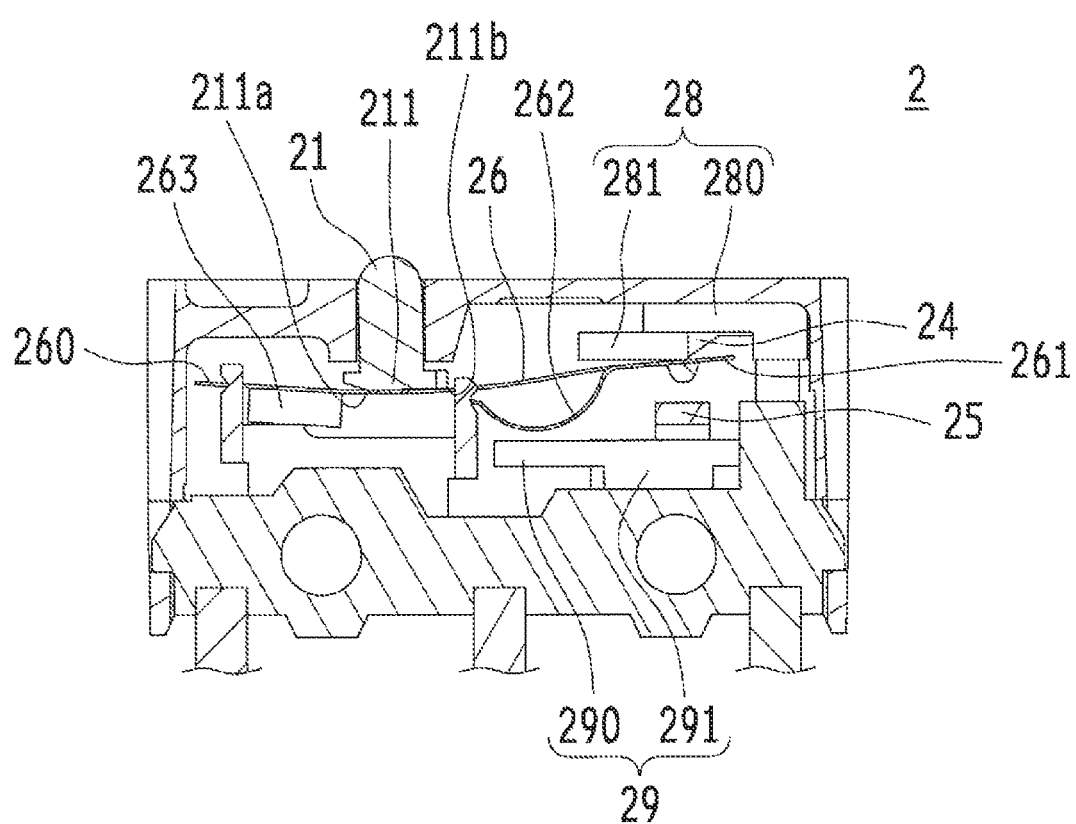
FIG. 24 is a schematic cross-sectional view illustrating one example of the operation of the switch described in the present application.

FIG. 24 illustrates a state in which the pressing member 21 has moved downward from the state illustrated in FIG. 23 by receiving a pressing force from an outside source. As a result of the pressing member 21 moving downward, the pressing plate 211 positioned in the lower portion of the pressing member 21 presses the movable member 26 downward.

Figure 25:
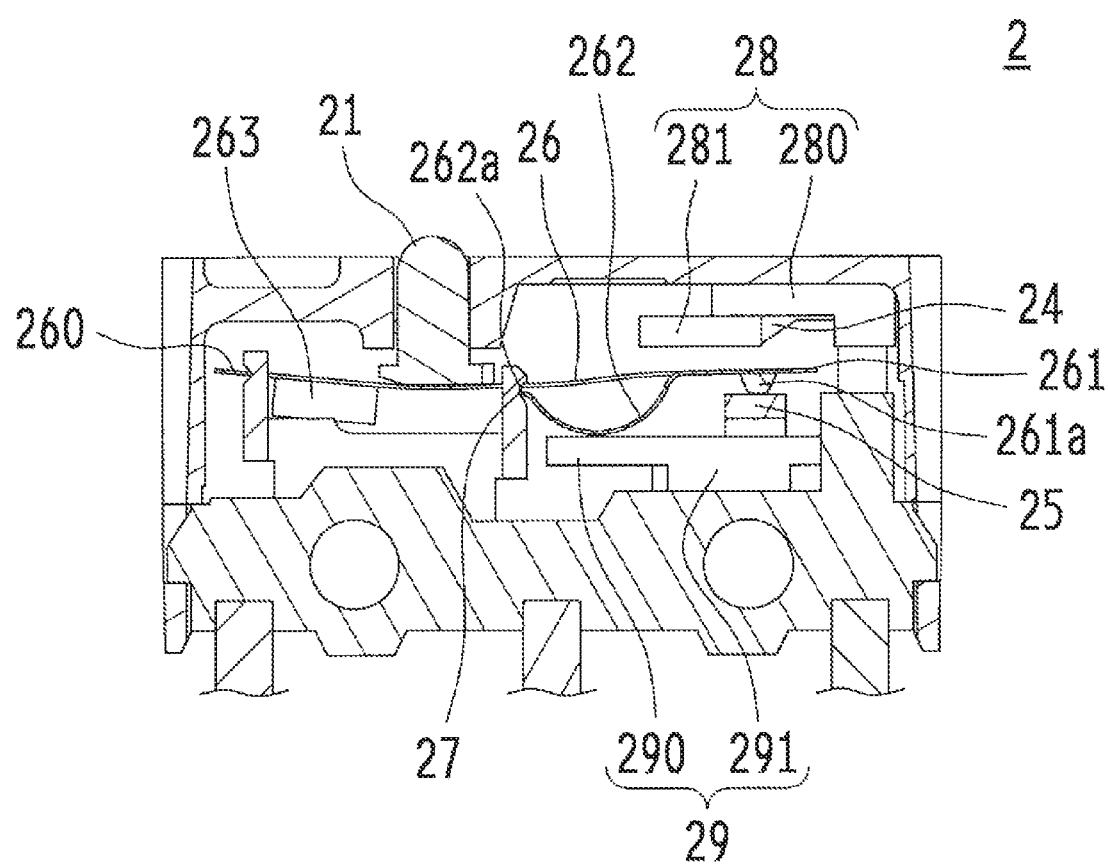
FIG. 25 is a schematic cross-sectional view illustrating one example of the operation of the switch described in the present application.

FIG. 25 illustrates a state in which the pressing member 21 has moved downward from the state illustrated in FIG. 24 by receiving further pressing from the outside. As a result of the pressing member 21 moving further downward, the entirety of the movable member 26 is pressed by the pressing member 21, and tries to move downward with the swing fulcrum 260 being the swing axis. Also, the biasing portion 262 of the movable member 26 swings downward with the locking portion 262a locked to the locking plate 27 being the swing axis, and therefore the entirety of the movable member 26 swings with the swing fulcrum 260 being the swing axis so as to turn over.

The contact protrusion 261a of the movable contact 261 collides with the second contact terminal 25 due to the momentum of turning over of the movable member 26, which induces a shock. However, the left end side of the plate-shaped body 290 of the biasing portion buffering member 29 into which the second contact terminal 25 is fitted warps, as indicated by the arrow in FIG. 22B, which absorbs the shock that is incurred when the movable contact 261 of the movable member 26 collides with the second contact terminal 25 and the shock generated when the biasing portion 262 swings. Also, as a result of mitigating the shock incurred when the movable contact 261 of the movable member 26 collides with the second contact terminal 25, the generation of sound due to the collision can be suppressed. Although the shock incurred by the collision of the movable contact 261 of the movable member 26 and the generation of sound due to the collision can be suppressed, the operation load increases because the bent portions 263 that are formed on both sides of the movable member 26 make the movable member 26 not easily warp. The force exerted by the bent portions 263 when resisting against warping is transmitted to an operator as a tactile feeling resisting against pressing, and therefore the operator can have strong click feeling.

Figure 26:
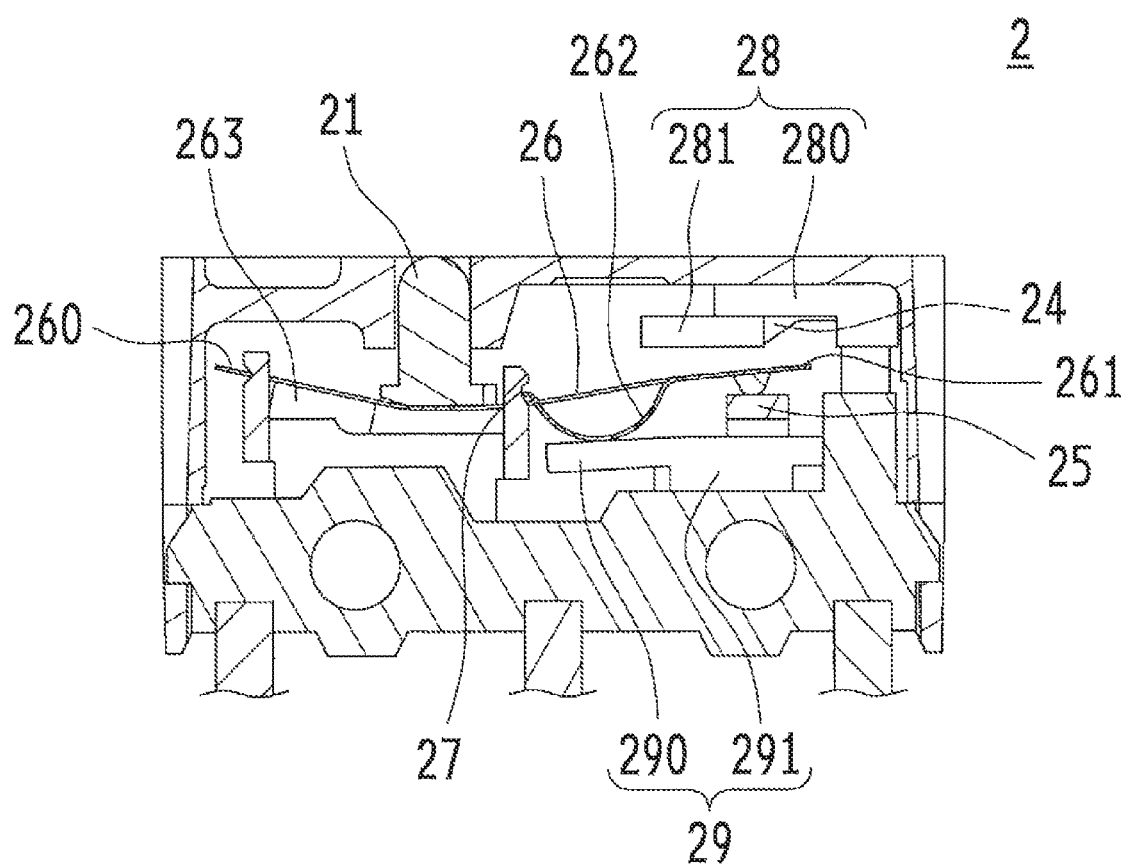
FIG. 26 is a schematic cross-sectional view illustrating one example of the operation of the switch described in the present application.

FIG. 26 illustrates a state in which the pressing member 21 has moved to the lowest point in the movable range from the state shown in FIG. 25 by receiving further pressing from the outside. As a result of the pressing member 21 moving to the lowest point, the entirety of the movable member 26 is pressed by the pressing member 21, and tries to move downward with the swing fulcrum 260 being the swing axis. Therefore, the movable member 26 is bent so as to warp downward while being supported by the swing fulcrum 260 and the movable contact 261 on both sides.

When the pressing of the pressing member 21 is removed, the movable member 26 is biased upward due to the reaction force of the biasing portion 262. As a result of the movable member 26 being biased upward, the pressing member 21 moves upward. Also, as a result of the movable member 26 being biased upward by the biasing portion 262, the movable contact 261, which is a free end of the movable member 26, moves upward, and comes into contact with the contact buffering member 28. That is, the state illustrated in FIG. 23 is achieved. The movable member 26 moves upward due to the pressing of the pressing member 21 being removed, and collides with the contact buffering member 28. The shock due to the collision is absorbed by the contact buffering member 28, and therefore the contact buffering member 28 mitigates the shock at the time of collision, and suppresses the generation of sound due to the collision.

Description has been given illustrating the first and second embodiments, the switch 2 described in the present application suppresses generation of sound caused by the movement of the movable member 26 with the shape of the pressing member 21, and buffering members such as the contact buffering member 28 and the biasing portion buffering member 29. Moreover, since the bent portion 263 resists against warping of the movable member 26, the switch 2 described in the present application exerts superior effects such as the operator being able to have strong click feeling while realizing sound reduction.

The switches 2 illustrated as the first and second embodiments can be expanded to various other modes. Specifically, the position and the shape of the bent portions 263 of the movable member 26 can be appropriately designed as long as the movable member 26 has a shape so as to resist against the warping, as shown in FIGS. 19A and 19B.

Figure 27A:
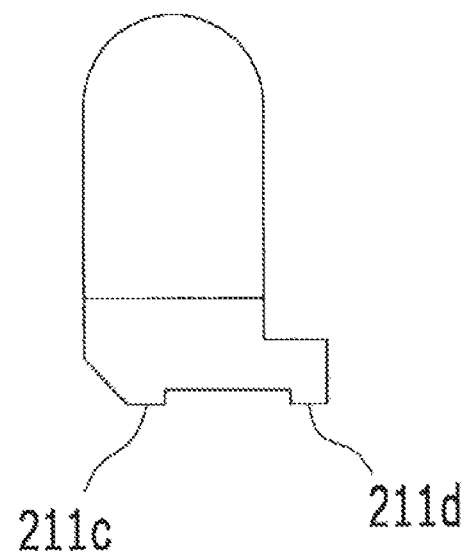
FIG. 27A is a schematic external view illustrating one example of the pressing member included in the switch described in the present application.
Figure 27B:
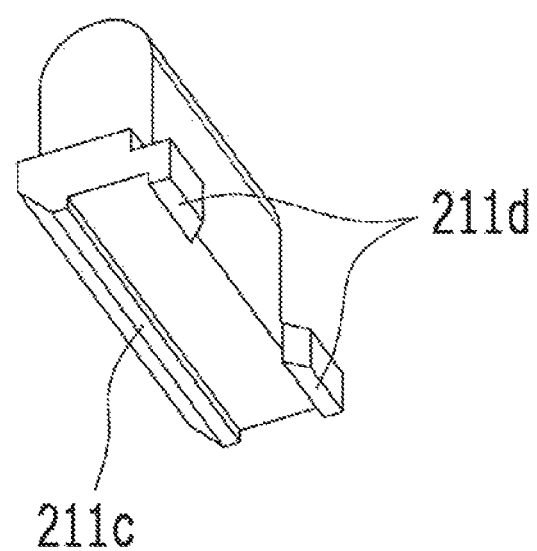
FIG. 27B is a schematic external view illustrating one example of the pressing member included in the switch described in the present application.

The other members included in the movable member 26, e.g., the shape of the pressing member 21, can also be appropriately designed. FIGS. 27A and 27B are schematic external views illustrating one example of the pressing member 21 included in the switch 2 described in the present application. FIG. 27A is a schematic front view, and FIG. 27B is a schematic perspective view when viewed from an obliquely downward viewpoint. In the pressing member 21 illustrated in FIGS. 27A and 27B, parts corresponding to the first ridge 211a and the second ridge 211b protrude downward, and are a first contact protruding portion 211c and a second contact protruding portion 211d. The pressing member 21 illustrated in FIGS. 27A and 27B comes into contact with the movable member 26 at the first contact protruding portion 211c and the second contact protruding portion 211d, and presses the movable member 26. That is, as illustrated in FIGS. 27A and 27B, the mode can be expanded to other modes that exerts a sound reduction effect, as long as pressing member 21 comes into contact with the movable member 26 at a plurality of positions when being pressed.

Third Embodiment

A third embodiment is a mode in which the movable member 26 in which the bent portions 263 are formed is applied to a contactless switch in which optical elements are used. Note that, in the following description, the constituent elements similar to those in the first and second embodiments are given the reference signs similar to those in the first and second embodiments for referencing to the first and second embodiments, and the description thereof will be omitted. An external view of an operation device 1 using a switch 2 according to the third embodiment is similar to those of the first and second embodiments, and therefore the description thereof will be omitted.

Figure 28:
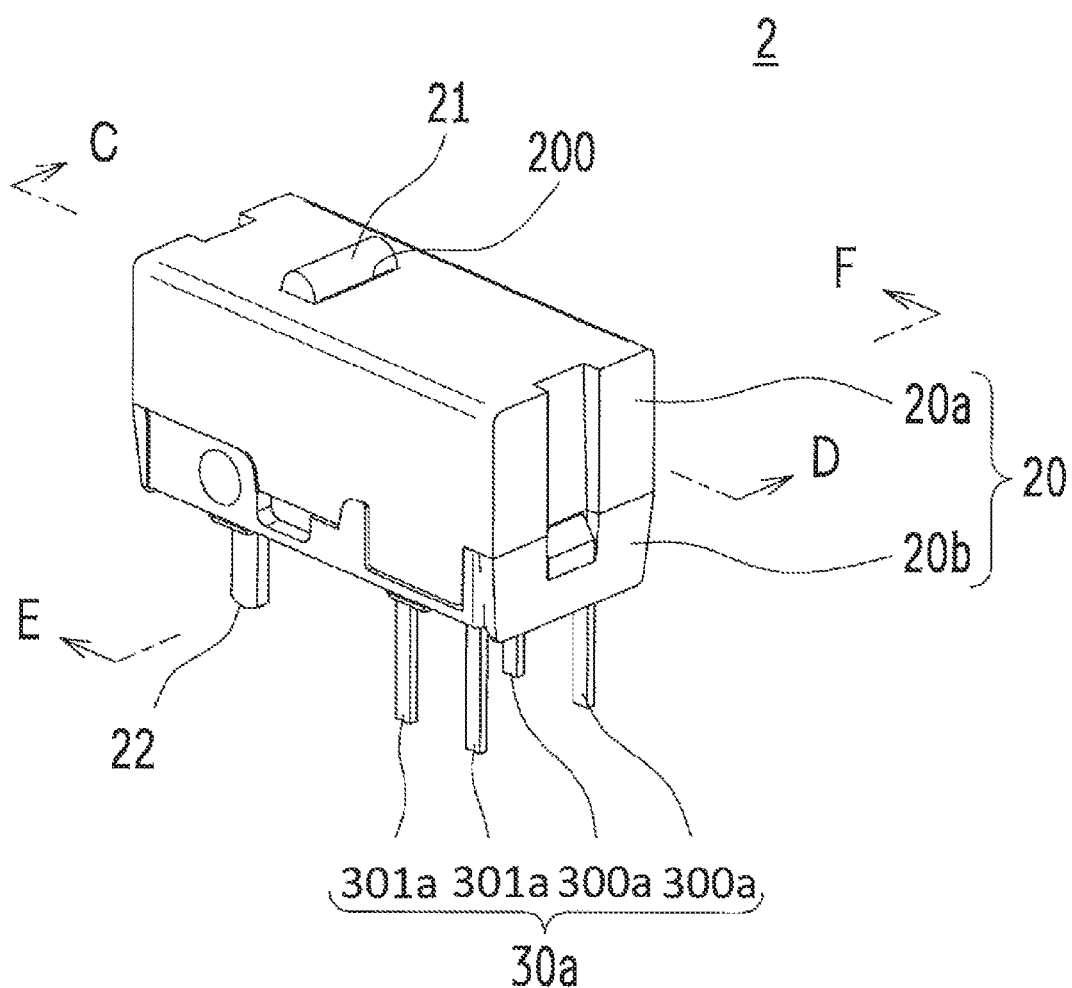
FIG. 28 is a schematic perspective view illustrating one example of an external view of the switch described in the present application.

The switch 2 according to the third embodiment will be described. FIG. 28 is a schematic perspective view illustrating one example of an external view of the switch 2 described in the present application. The switch 2 is housed inside an electronic apparatus such as an operation device 1 as a micro switch, and receives a pressing down operation received by a part such as a pressing down operation portion 10 of the operation device 1 as pressing from the outside.

The switch 2 includes a casing 20 having a substantially rectangular solid shape. One connection terminal portion 22 for fixing the switch 2 to an external member such as a substrate and four optical contact terminals 30a that extend from a later-described optical contact 30 (refer to FIG. 29 and the like) housed inside the casing 20 protrude from a lower face of the casing 20. The connection terminal portion 22 protrudes from the lower face of the switch 2 on a left end side. The optical contact terminals 30a protrude from the lower face of the switch 2 on a right end side, side by side in front-back and left-right directions. A pair of first optical contact terminals 300a extending from a light emitting circuit 300 (refer to FIG. 29 and the like) protrude on a rear side, and a pair of second optical contact terminals 301a extending from a light receiving circuit 301 (refer to FIG. 29 and the like) protrude on a front side, as the optical contact terminals 30a.

Figure 29:
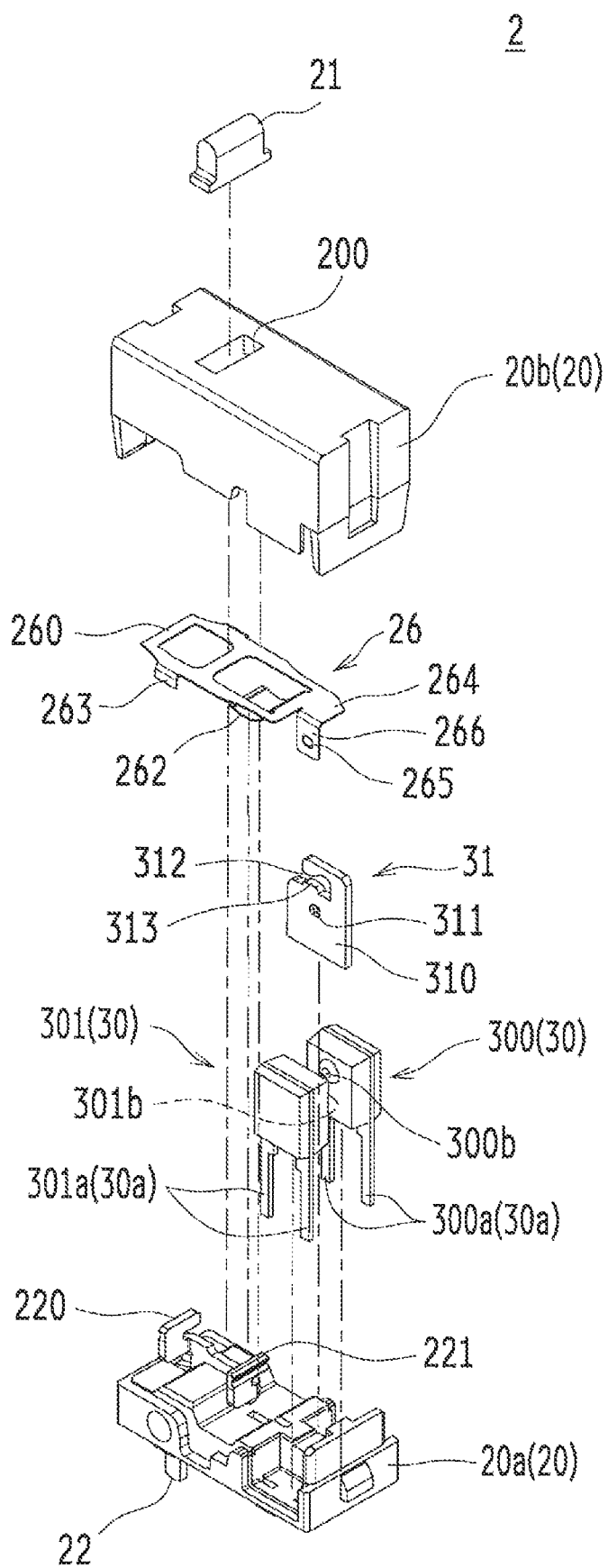
FIG. 29 is a schematic exploded perspective view illustrating one example of the switch described in the present application.
Figure 30:
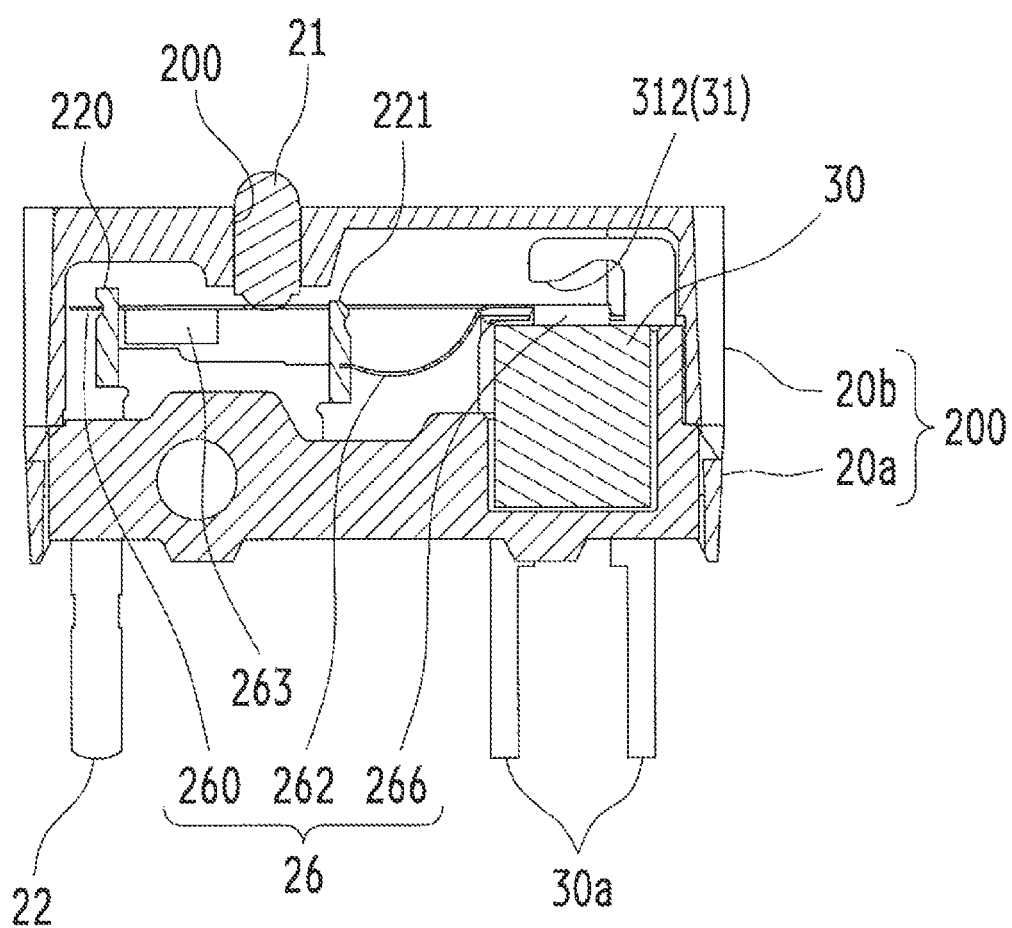
FIG. 30 is a schematic cross-sectional view illustrating one example of a cross section of the switch described in the present application.

Next, the internal structure of the switch 2 will be described. FIG. 29 is a schematic exploded perspective view illustrating one example of the switch 2 described in the present application. FIG. 30 is a schematic cross-sectional view illustrating one example of a cross section of the switch 2 described in the present application. FIG. 30 illustrates a cross section cut by a vertical plane including a line C-D shown in FIG. 28 viewed from a frontal viewpoint.

A region serving as a contact chamber for housing a contact mechanism for opening/closing an electrical circuit is secured inside the casing 20 of the switch 2. An insertion hole 200 that passes through the casing 20 from the outside is provided in an upper face of the contact chamber, and a pressing member 21 is inserted into the insertion hole 200.

The contact mechanism housed inside the contact chamber will be described. A first locking terminal 220, a second locking terminal 221, a movable member 26, and a fixing member 31 are provided inside the contact chamber as the contact mechanism in addition to the optical contact 30 described above. The optical contact 30 is provided as the light receiving circuit 301 and the light emitting circuit 300 that are arranged in a front-back direction on a lower right side of the contact chamber. The first locking terminal 220 is provided on a lower left side inside the contact chamber, and the second locking terminal 221 is provided on a central lower side inside the contact chamber. The first locking terminal 220 and the second locking terminal 221 are integrally formed, by molding, with the connection terminal portion 22 downward of the casing 20. The fixing member 31 is provided between the light emitting circuit 300 and the light receiving circuit 301 that are included in the optical contact 30 on a right side inside the contact chamber. The movable member 26 is provided so as to extend in a left-right direction inside the contact chamber, and is locked by the first locking terminal 220 and the second locking terminal 221.

The optical contact 30 includes the light emitting circuit 300 that emits light, and the light receiving circuit 301 that receives light emitted from the light emitting circuit 300. The light emitting circuit 300 is constituted by a light-emitting element 300b such as an LED (Light Emitting Diode), and includes the pair of first optical contact terminals 300a. The light receiving circuit 301 is constituted using a light receiving element 301b such as a PD (Photo Diode) or a PT (Photo Transistor), and includes the pair of second optical contact terminals 301a. The light-emitting element 300b of the light emitting circuit 300 and the light receiving element 301b of the light receiving circuit 301 are provided at opposing positions so as to oppose each other such that the light emitted from the light emitting circuit 300 can be received by the light receiving circuit 301. As a result of supplying electricity to the light emitting circuit 300 through the first optical contact terminals 300a, the light-emitting element 300b of the light emitting circuit 300 emits light. The conductive state of the light receiving element 301b of the light receiving circuit 301 changes when detecting light, and therefore the light receiving circuit 301 outputs an ON signal based on the change in conductive state due to light reception from the second optical contact terminals 301a.

The fixing member 31 has an upright thin plate shape that is provided such that the normal direction thereof is in a front-back direction, and is provided at a position forward of the light emitting circuit 300 of the optical contact 30 and rearward of the light receiving circuit 301 so as to be separated from the light emitting circuit 300 and the light receiving circuit 301. The lower portion of the fixing member 31 is a light blocking plate 310 in which a substantially circular transmission hole 311 is provided such that the light of the optical contact 30 passes through, and the upper portion is formed in a substantially U shape that is bent in an arm-like shape and opens on a left side. The fixing member 31 is provided such that a movable abutting portion 264 of the movable member 26 on a right end side is sandwiched from above and below in the U-shaped opening of the upper portion. The inside upper portion above the opening of the fixing member 31 is a first abutting part 312 that is brought into contact with a movable abutting portion 264 of the movable member 26, when the pressing member 21 is positioned upward and the movable member 26 is not pressed by the pressing member 21. The inside lower portion under the opening of the fixing member 31 is a second abutting part 313 that is brought into contact with the movable abutting portion 264 of the movable member 26 when the pressing member 21 moves downward by being pressed down and the movable member 26 is pressed by the pressing member 21. The movable abutting portion 264 of the movable member 26 extends so as to enter between the first abutting part 312 and the second abutting part 313 of the fixing member 31. The leading end of the first abutting part 312 of the fixing member 31 that extends toward a left side protrudes downward such that the movable member 26 that is not pressed easily comes into contact therewith, and the movable member 26 comes into contact with the first abutting part 312 from below. The central portion of the second abutting part 313 of the fixing member 31 protrudes upward such that the pressed movable member 26 easily comes into contact therewith, and the movable member 26 comes into contact with the second abutting part 313 from above. It is preferable that the fixing member 31 is formed using metal material in order to generate an appropriate click sound, but it is possible to form using material such as organic material rubber, inorganic material rubber, or rigid resin. Also, the fixing member 31 can be replaced appropriately in order to make the click sound appropriate, for example.

The movable member 26 is a metal member made of SUS or the like that has a plate shape extending in a left-right direction inside the contact chamber. The left end side of the movable member 26 is locked to the first locking terminal 220, and is a fixed end functioning as a swing fulcrum 260. The right end side of the movable member 26 is a movable abutting portion 264 that moves, as a free end, between the first abutting part 312 and the second abutting part 313 of the fixing member 31. Also, the right end side of the movable member 26 is a light blocking piece 266 having a substantially rectangular shape that is bent downward from the movable abutting portion 264. The light blocking piece 266 is formed such that the normal direction is a front-back direction, and is provided with a transmission window 265 having a substantially rectangular shape through which light of the optical contact 30 passes. The light blocking piece 266 is positioned so as to enter between the fixing member 31 and the light receiving circuit 301 in a state of separating from the fixing member 31 and the light receiving circuit 301, at a position in front of the fixing member 31 and behind the light receiving circuit 301 of the optical contact 30. The movable member 26 is provided with a biasing portion 262 that is formed by the vicinity of the central portion being punched out and folded in an arc shape, and functions as a return spring, and a leading end of the biasing portion 262 is locked to the second locking terminal 221 formed in the vicinity of the central portion inside the contact chamber. The biasing portion 262 generates a reaction force to resist against the pressing of the pressing member 21. Bent portions 263 that are bent downward, which is a swinging direction, are formed in side portions of the movable member 26. The bent portions 263 are formed by downwardly folding protruding pieces that expand in a rectangular shape from both sides of the opposing side portions of the movable member 26.

In the contact mechanism constituted in this way, the pressing member 21 moves downward by receiving a pressing force from an outside source, and presses down the movable member 26. As a result of the movable member 26 being pressed down, the movable abutting portion 264 on a right end side, which is a free end of the movable member 26 moves downward, and the movable abutting portion 264 comes into contact with the second abutting part 313 of the fixing member 31. As a result of the movable abutting portion 264 of the metal movable member 26 coming into contact with the second abutting part 313 of the fixing member 31 in a collision-like manner, a metallic sound is generated. The user recognizes the metallic sound generated due to the movable member 26 coming into contact with the fixing member 31 as a click sound. The bent portions 263 resist against the warping of the movable member 26 when the movable member 26 warps upon receiving pressing from the pressing member 21, and therefore the operator can have a strong click feeling. Also, as a result of the right end side of the movable member 26 moving downward, the light blocking piece 266 of the movable member 26 moves downward, and the light of the optical contact 30 passes through the transmission window 265 provided in the light blocking piece 266 of the movable member 26, and the optical contact 30 enters an on state in which the circuit is closed and outputs an ON signal to an external electronic apparatus.

When the pressing of the pressing member 21 is removed, the movable member 26 is biased upward due to the reaction force of the biasing portion 262. As a result of the movable member 26 being biased upward, the pressing member 21 moves upward. Also, as a result of the movable member 26 being biased upward by the biasing portion 262, the movable abutting portion 264 that is positioned on a right end side of the movable member 26 moves upward, and comes into contact with the first abutting part 312 of the fixing member 31. Also, as a result of the right end side of the movable member 26 moving upward, the light blocking piece 266 of the movable member 26 moves upward, and the light of the optical contact 30 is blocked by the light blocking piece 266, and the optical contact 30 enters an off state in which the circuit is open.

Figure 31A:
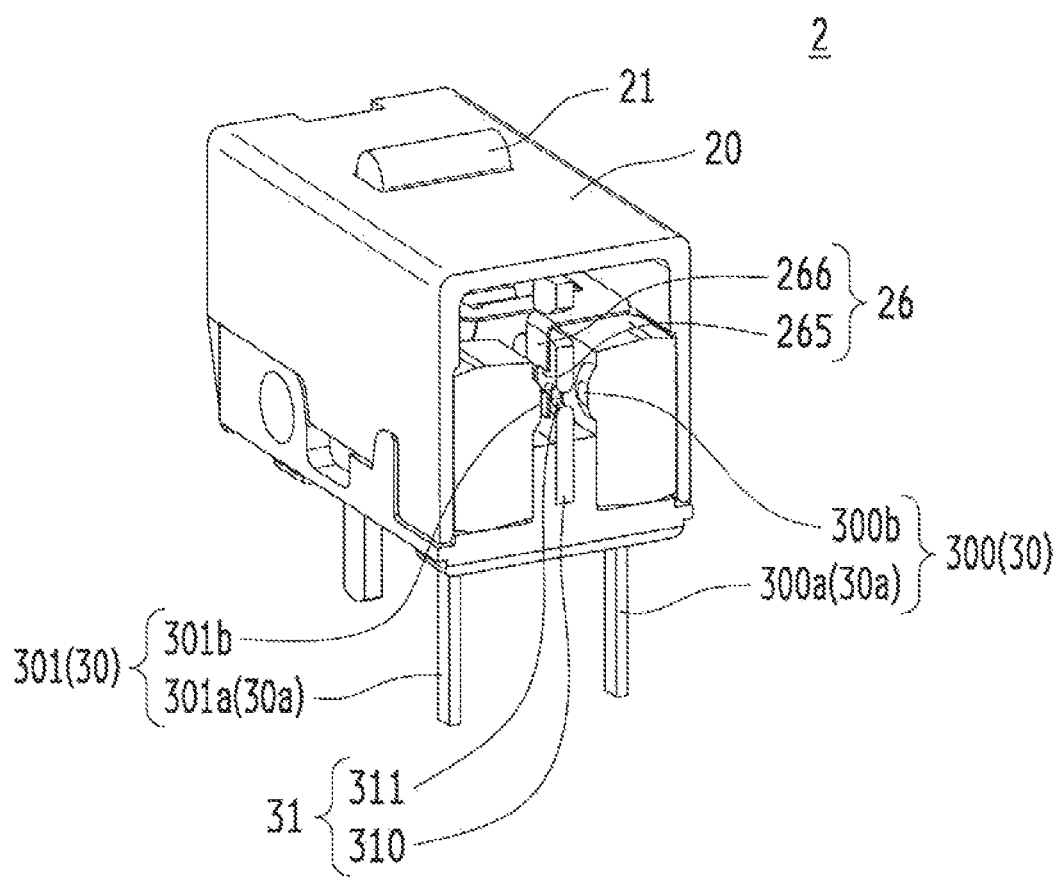
FIG. 31A is a schematic cross-sectional view illustrating one example of the cross section of the switch described in the present application.
Figure 31B:
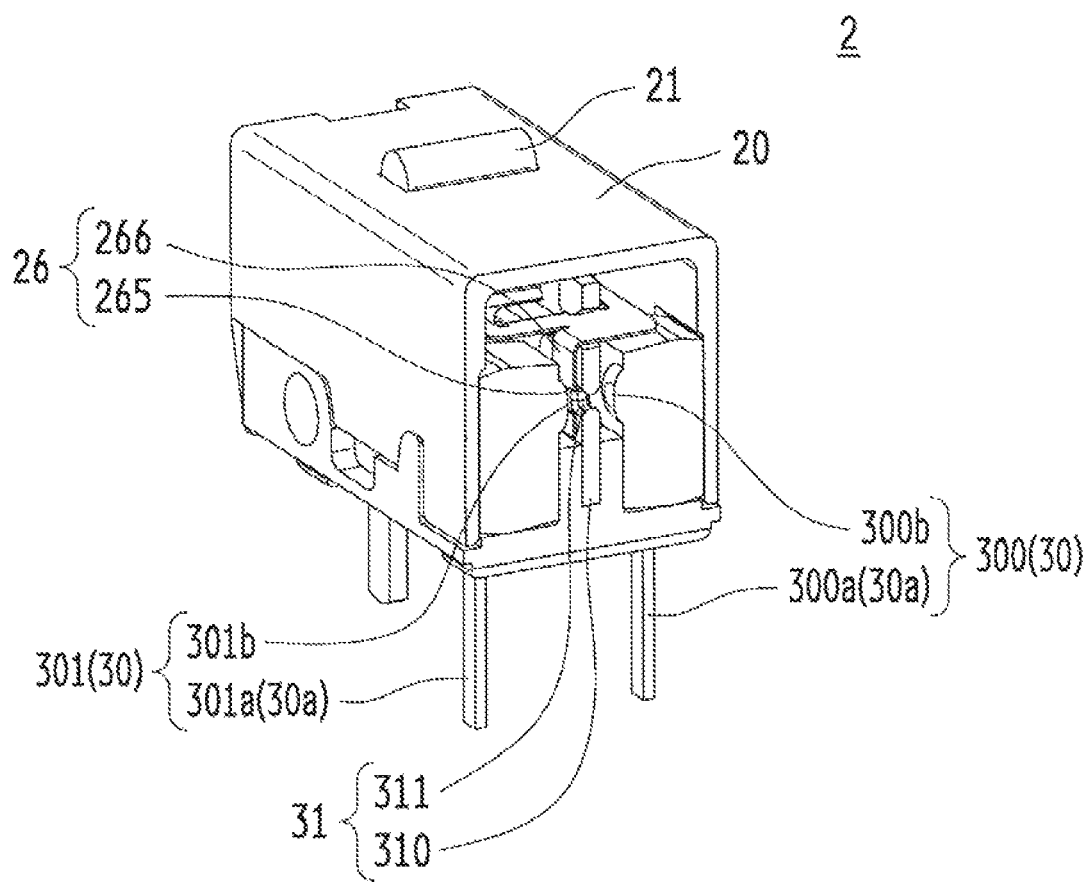
FIG. 31B is a schematic cross-sectional view illustrating one example of the cross section of the switch described in the present application.
Figure 32:
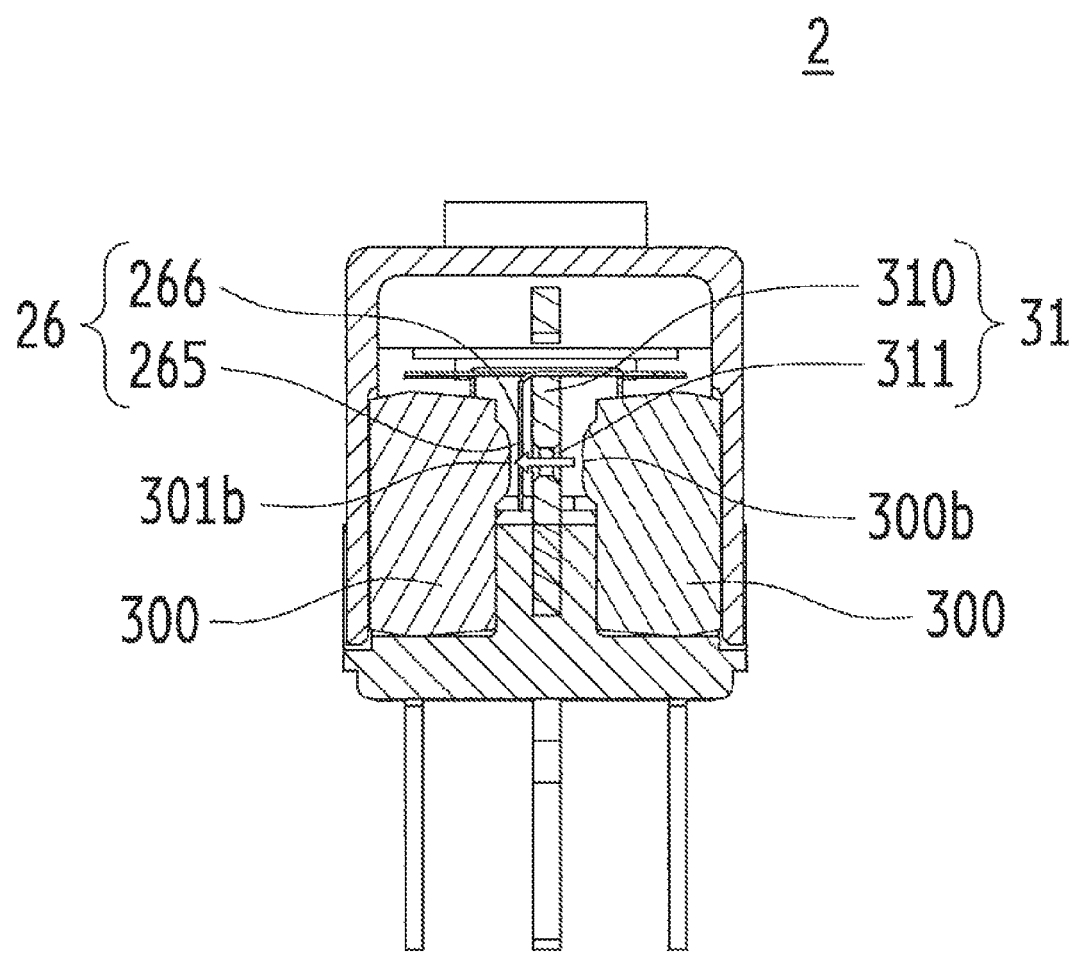
FIG. 32 is a schematic cross-sectional view illustrating one example of the cross section of the switch described in the present application.

Opening/closing of the circuit of the optical contact 30 by the fixing member 31 and the movable member 26 will further be described. FIGS. 31A, 31B, and 32 are schematic cross-sectional views illustrating one example of the cross section of the switch 2 described in the present application. FIGS. 31A and 31B show a cross section cut by a vertical plane including a line E-F shown in FIG. 28 from an obliquely right upward viewpoint in an enlarged manner. FIG. 32 shows the cross section cut by the vertical plane including a line E-F shown in FIG. 28 from a rightward viewpoint. Note that FIG. 31A shows an off state in which the pressing member 21 is positioned upward, pressing by the pressing member 21 is removed, and the circuit is open. FIGS. 31B and 32 show an on state in which the pressing member 21 has moved downward, pressing by the pressing member 21 is performed, and the circuit is closed.

When pressing by the pressing member 21 is removed, as shown in FIG. 31A, the light blocking piece 266 of the movable member 26 has moved upward, and the transmission window 265 of the light blocking piece 266 is outside the light path from the light-emitting element 300b of the light emitting circuit 300 to the light receiving element 301b of the light receiving circuit 301. Therefore, light emitted from the light-emitting element 300b of the light emitting circuit 300 passes through the transmission hole 311 provided in the light blocking plate 310 of the fixing member 31, but is blocked by the light blocking piece 266 of the movable member 26, and therefore the light cannot reach the light receiving element 301b of the light receiving circuit 301, and the optical contact 30 enters an off state in which the circuit is open.

When the pressing member 21 is pressed, as shown in FIGS. 31B and 32, the light blocking piece 266 of the movable member 26 moves downward, and the light path from the light-emitting element 300b of the light emitting circuit 300 to the light receiving element 301b of the light receiving circuit 301 passes through the transmission window 265 provided in the light blocking piece 266. Therefore, as indicated by the open arrow in FIG. 32, the light emitted from the light-emitting element 300b of the light emitting circuit 300 passes through the transmission hole 311 provided in the light blocking plate 310 of the fixing member 31, furthermore passes through the transmission window 265 provided in the light blocking piece 266 of the movable member 26, and reaches the light receiving element 301b of the light receiving circuit 301, and as a result, the optical contact 30 enters an on state in which the circuit is closed.

As described above, as a result of using the movable member 26 in which the bent portions 263 are formed and that include the light blocking piece 266, the switch 2 described in the present application according to the third embodiment generates click feeling and also generates a click sound in response to a pressing down operation performed on the pressing down operation portion 10 of a mouse. With this, superior effects can be exerted such as the user being able to recognize that the click operation is completed from the click feeling and the click sound.

Figure 33:
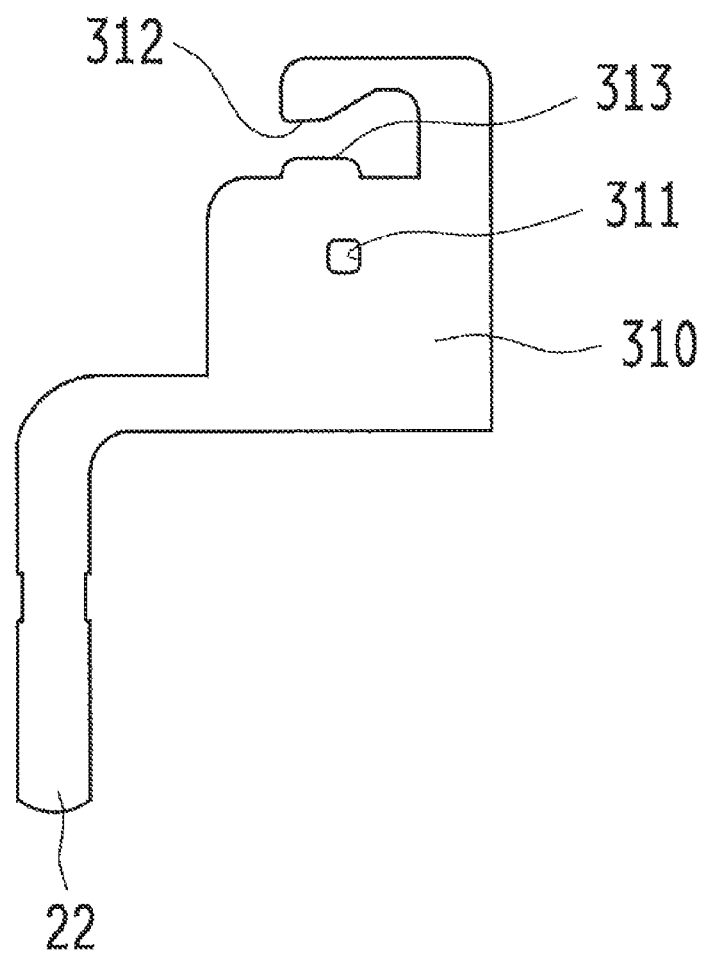
FIG. 33 is a schematic front view illustrating one example of an external view of a fixing member included in the switch described in the present application.

The switch 2 described in the present application that has been described as the third embodiment is not limited to the illustrated embodiment, and can be expanded to various other modes. For example, the fixing member 31 used in the switch 2 is not limited to the shape illustrated as the third embodiment, and can be appropriately designed. FIG. 33 is a schematic front view illustrating one example of an external view of the fixing member 31 included in the switch 2 described in the present application. In the fixing member 31 illustrated in FIG. 33, a lower left side, toward the drawing, extends downward, and is a connection terminal portion 22 that protrudes downward in the vicinity of the center of the lower face of the casing 20 (protrudes in a pressing direction of the pressing member 21). As a result of integrally forming the fixing member 31 and the connection terminal portion 22 by molding, the area of the light blocking plate 310 of the fixing member 31 increases, and as a result, the light blocking property can be improved, various light can be blocked, generation of noise can be suppressed, and the accuracy can be improved.

Also, the switch 2 described in the present application can also be expanded to a mode in which the fixing member 31 is removed from the third embodiment, for example. As a result of removing the fixing member 31, superior effects can be exerted such as being able to generate click feeling while exerting a sound reduction effect by suppressing generation of a click sound.

Fourth Embodiment

A fourth embodiment is a mode in which, in a contactless switch using the optical element illustrated in the third embodiment, an optical contact 30 is mounted as a surface mounting type chip. Note that, in the following description, the constituent elements similar to those in the first to third embodiments are given the reference signs similar to those in the first to third embodiments for referencing to the first to third embodiments, and the description thereof will be omitted. An external view of an operation device 1 using a switch 2 according to the fourth embodiment is similar to those of the first to third embodiments, and therefore the description thereof will be omitted.

Figure 34:
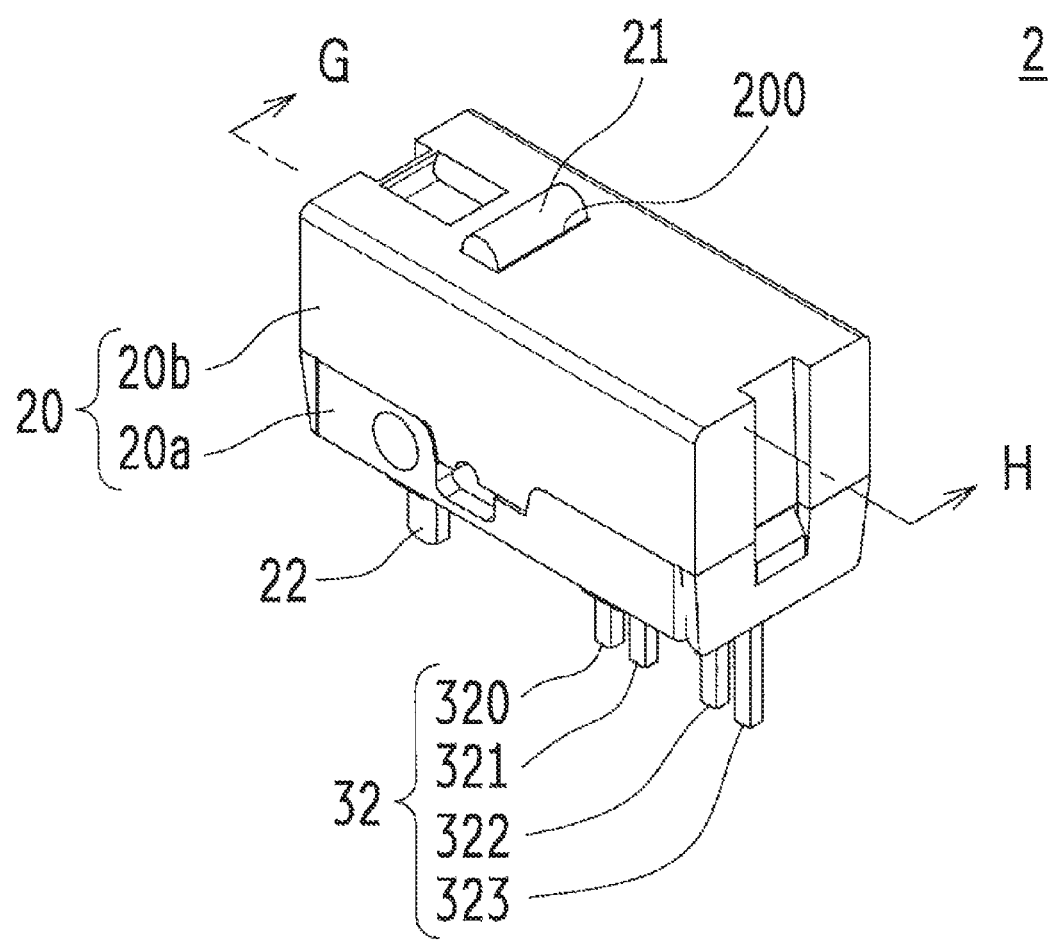
FIG. 34 is a schematic perspective view illustrating one example of an external view of the switch described in the present application.

The switch 2 according to the fourth embodiment will be described. FIG. 34 is a schematic perspective view illustrating one example of an external view of the switch 2 described in the present application. The switch 2 is housed inside an electronic apparatus such as an operation device 1 as a micro switch, and receives a pressing down operation received by a part such as a pressing down operation portion 10 of the operation device 1 as pressing from the outside.

The switch 2 includes a casing 20 having a substantially rectangular solid shape. One connection terminal portion 22 for fixing the switch 2 to an external member such as a substrate and four optical contact terminals 32 that extend from the later-described optical contact 30 (refer to FIG. 35 and the like) housed inside the casing 20 protrude from a lower face of the casing 20. The connection terminal portion 22 protrudes downward from a left end side of a lower face of the switch 2. A third optical contact terminal 320, a fourth optical contact terminal 321, a fifth optical contact terminal 322, and a sixth optical contact terminal 323 are arranged in this order from the vicinity of the center toward the right end side of the lower face of the switch 2, as the mounting optical contact terminals 32.

Figure 35:
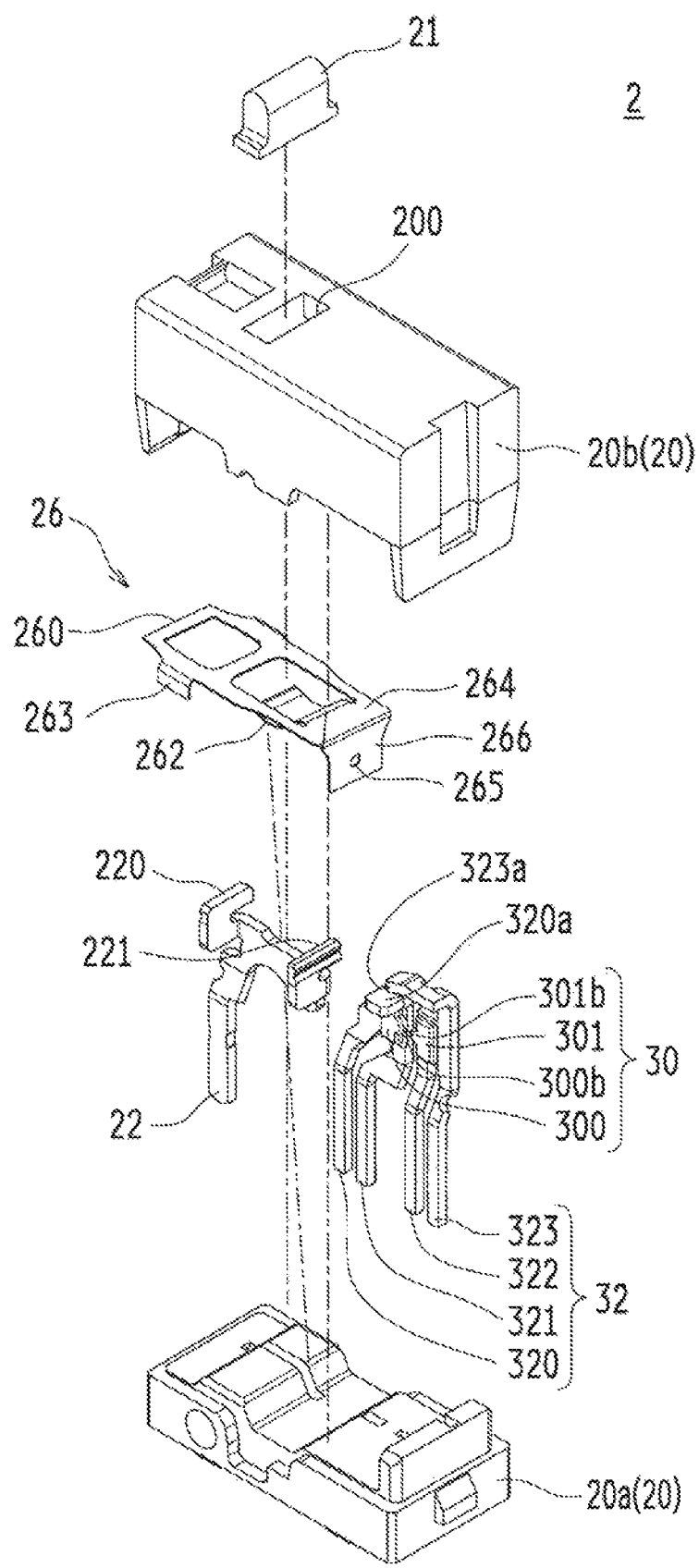
FIG. 35 is a schematic exploded perspective view illustrating one example of the switch described in the present application.
Figure 36:
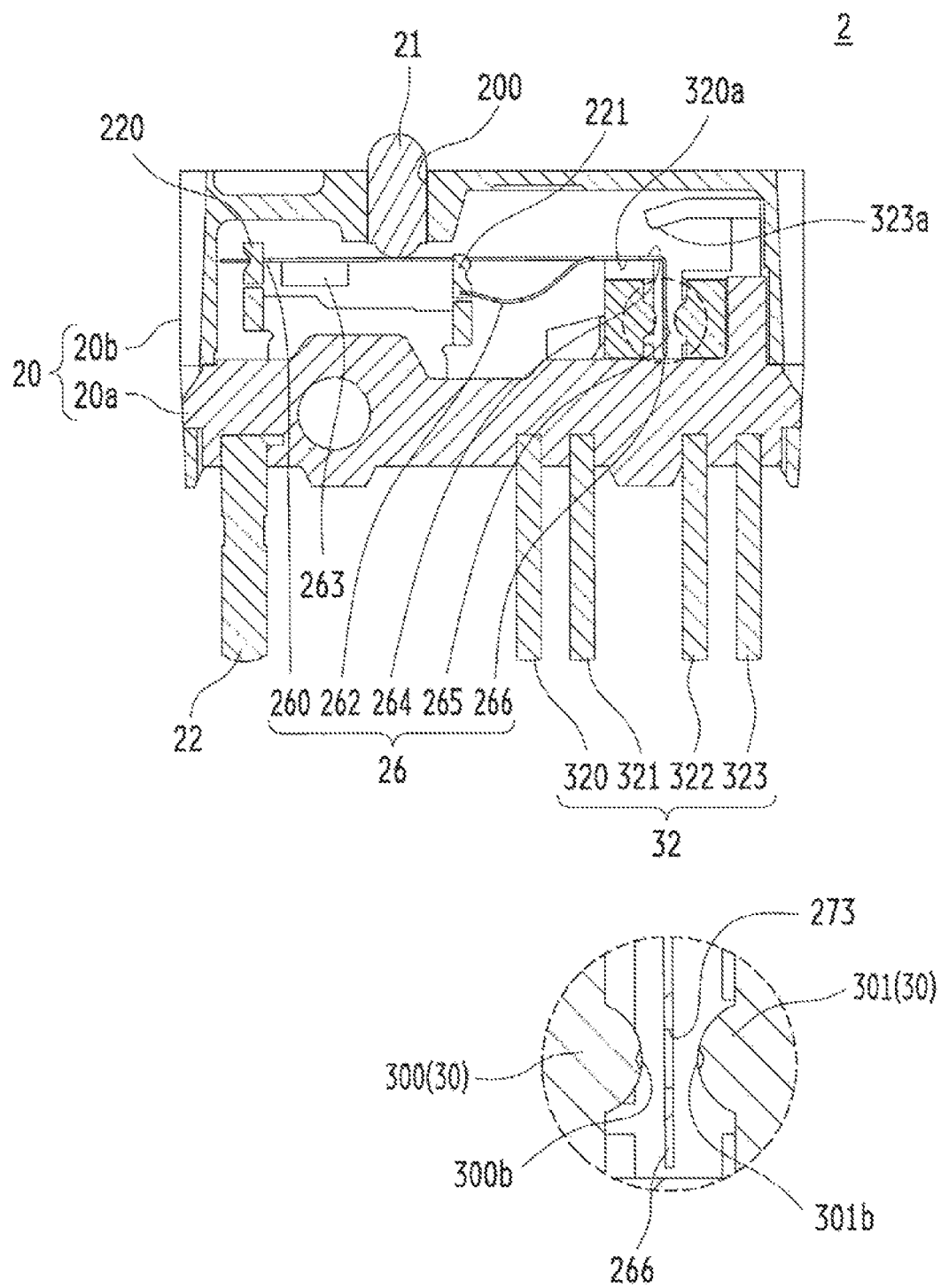
FIG. 36 is a schematic cross-sectional view illustrating one example of the cross section of the switch described in the present application.
Figure 37:
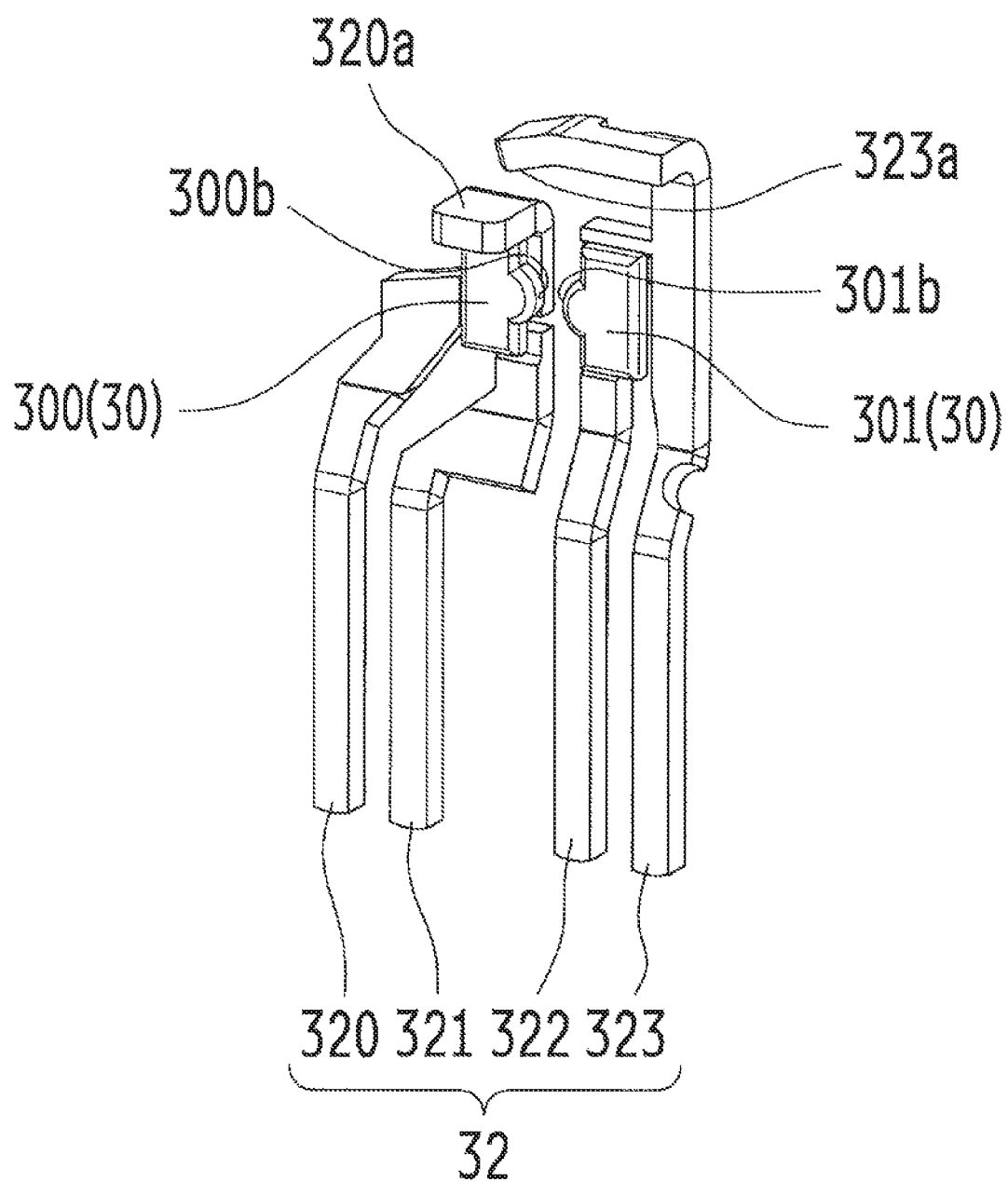
FIG. 37 is a schematic perspective view illustrating one example of an optical contact and mounting optical contact terminals that are included in the switch described in the present application.

Next, the internal structure of the switch 2 will be described. FIG. 35 is a schematic exploded perspective view illustrating one example of the switch 2 described in the present application. FIG. 36 is a schematic cross-sectional view illustrating one example of the cross section of the switch 2 described in the present application. FIG. 37 is a schematic perspective view illustrating one example of the optical contact 30 and the mounting optical contact terminals 32 that are included in the switch 2 described in the present application. FIG. 36 shows a cross section cut by a vertical plane including a line G-H in FIG. 34 from a frontal viewpoint. Note that a portion of the internal structure of the switch 2 that is surrounded by a broken-line circle is illustrated in an enlarged manner, in FIG. 36. FIG. 37 shows the optical contact 30 and the mounting optical contact terminal 32 from an obliquely right upward viewpoint.

A region serving as a contact chamber for housing a contact mechanism for opening/closing an electrical circuit is secured inside the casing 20 of the switch 2. An insertion hole 200 that passes through the casing 20 from the outside is provided in an upper face of the contact chamber, and a pressing member 21 is inserted into the insertion hole 200.

The contact mechanism housed inside the contact chamber will be described. A first locking terminal 220, a second locking terminal 221, and a movable member 26 are provided inside the contact chamber of the casing 20 as the contact mechanism in addition to the optical contact 30 described above. The optical contact 30 is provided as a light emitting circuit 300 and a light receiving circuit 301 that are arranged side by side in a left-right direction on a right lower side of the contact chamber. The first locking terminal 220 is provided on a lower left side inside the contact chamber, and the second locking terminal 221 is provided on a central lower side inside the contact chamber. The first locking terminal 220, the second locking terminal 221, and the connection terminal portion 22 downward of the casing 20 are integrally formed by molding. The movable member 26 is provided so as to extend in a left-right direction inside the contact chamber, and is locked to the first locking terminal 220 and the second locking terminal 221.

The optical contact 30 includes the light emitting circuit 300 and the light receiving circuit 301. The light emitting circuit 300 of the optical contact 30 is formed as a surface mounting type chip using a light-emitting element 300b. The light receiving circuit 301 of the optical contact 30 is formed as a surface mounting type chip using a light receiving element 301b. The light emitting circuit 300 has a flat rectangular solid shape, a portion of the side face protrudes in a flat semicircular shape, and the light-emitting element 300b is incorporated in the protruded part. The light receiving circuit 301 has a flat rectangular solid shape, a portion of the side face protrudes in a flat semicircular shape, and the light receiving element 301b is incorporated in the protruded part. The light-emitting element 300b of the light emitting circuit 300 and the light receiving element 301b of the light receiving circuit 301 are provided at positions opposing each other such that the light receiving circuit 301 receives light emitted from the light emitting circuit 300.

The light emitting circuit 300 of the optical contact 30 is surface-mounted on the third optical contact terminal 320 and the fourth optical contact terminal 321 so as to extend between the third optical contact terminal 320 and the fourth optical contact terminal 321, of the mounting optical contact terminals 32, that are provided on the left side. The light receiving circuit 301 of the optical contact 30 is surface-mounted on the fifth optical contact terminal 322 and the sixth optical contact terminal 323 so as to extend between the fifth optical contact terminal 322 and the sixth optical contact terminal 323, of the mounting optical contact terminals 32, that are provided on the right side.

Figure 38A:
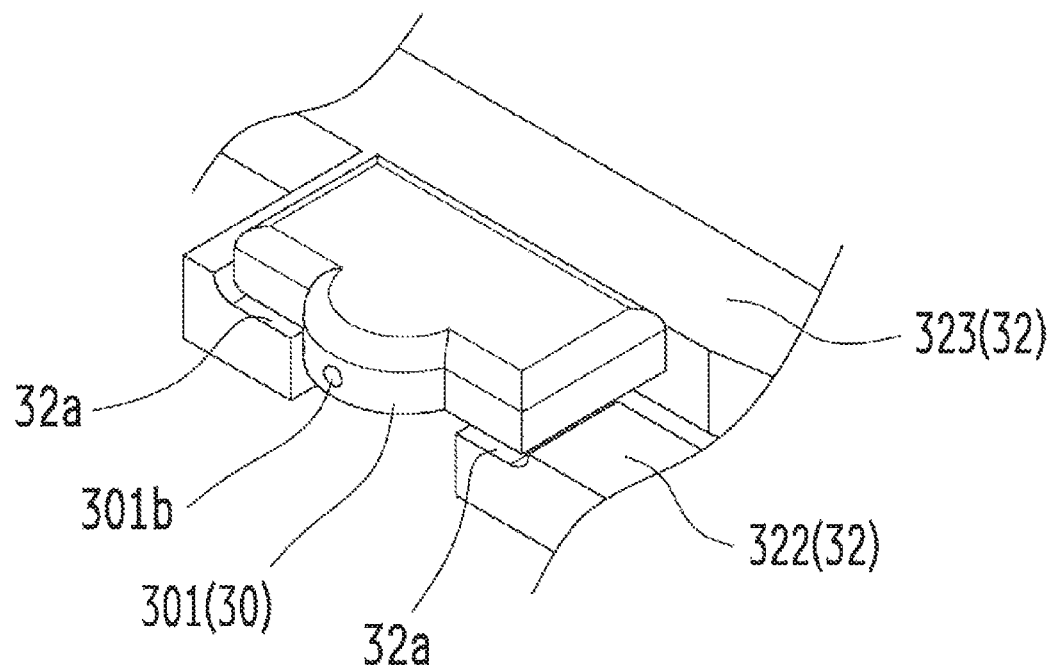
FIG. 38A is a schematic enlarged view illustrating a portion, in an enlarged manner, of one example of the optical contact and the mounting optical contact terminals that are included in the switch described in the present application.
Figure 38B:
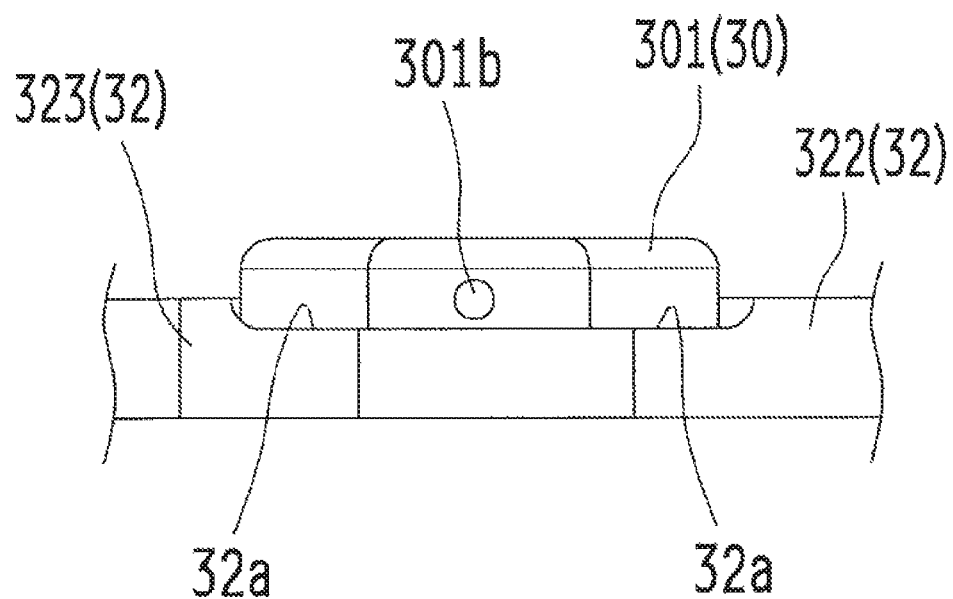
FIG. 38B is a schematic enlarged view illustrating a portion, in an enlarged manner, of one example of the optical contact and the mounting optical contact terminals that are included in the switch described in the present application.

FIGS. 38A and 38B are schematic enlarged views illustrating a portion, in an enlarged manner, of one example of the optical contact 30 and the mounting optical contact terminals 32 that are included in the switch 2 described in the present application. FIG. 38A is a schematic perspective view in which a mounting portion of the light receiving circuit 301 of the optical contact 30 that is mounted on the fifth optical contact terminal 322 and the sixth optical contact terminal 323 is illustrated in an enlarged manner, and FIG. 38B is a schematic side view from a leftward viewpoint. Note that FIG. 38A and FIG. 38B are shown so that the upward direction is on the left side thereof, for the sake of illustration. Recesses 32a for mounting the light receiving circuit 301 are formed in the fifth optical contact terminal 322 and the sixth optical contact terminal 323, and the light receiving circuit 301 is surface-mounted in the recesses 32a in a state of being mounted on the fifth optical contact terminal 322 and the sixth optical contact terminal 323. The same is applied to the third optical contact terminal 320 and the fourth optical contact terminal 321 on which the light emitting circuit 300 is surface-mounted, and recesses 32a for surface-mounting the light emitting circuit 300 in a state of being mounted thereon are formed. As a result of forming the recesses 32a in the mounting optical contact terminals 32, and surface-mounting the optical contact 30 in a state of being mounted on the recesses 32a, positioning becomes easy when performing surface-mounting, and the thickness of the mounting portion in the front-back direction can be reduced.

Returning to FIGS. 35, 36, and 37, the mounting optical contact terminals 32 will further be described. An upper portion of the sixth optical contact terminal 323 extends upward and is bent leftward in an arm-like shape so as to protrude to a portion in the vicinity of an upward portion of the third optical contact terminal 320 and the fourth optical contact terminal 321, and the protruded portion is bent forward so as to form a third abutting part 323a with which a movable abutting portion 264 of the movable member 26 on the right end side comes into contact. An upper portion of the third optical contact terminal 320 protrudes upward, and the protruded portion is bent forward so as to form a fourth abutting part 320a with which the movable abutting portion 264 of the movable member 26 comes into contact. The movable member 26 is provided such that the movable abutting portion 264 on the right end side enters between the third abutting part 323a and the fourth abutting part 320a. Also, the movable member 26, when being not pressed by the pressing member 21, comes into contact with the third abutting part 323a from below, and upon being pressed, comes into contact with the fourth abutting part 320a from above.

As a result of supplying electricity to the light emitting circuit 300 through the third optical contact terminal 320 and the fourth optical contact terminal 321, the light-emitting element 300b of the light emitting circuit 300 emits light. The conductive state of the light receiving element 301b of the light receiving circuit 301 changes when detecting light, and therefore the light receiving circuit 301 outputs an ON signal based on the change in conductive state due to light reception, from the fifth optical contact terminal 322 and the sixth optical contact terminal 323.

The movable member 26 is a metal member made of SUS or the like that has a plate shape extending in a left-right direction inside the contact chamber. The right end side of the movable member 26 is the movable abutting portion 264 that moves between the third abutting part 323a and the fourth abutting part 320a as a free end, and furthermore, the leading end of the movable abutting portion 264 is bent downward to form a light blocking piece 266. The light blocking piece 266 is formed such that the normal direction is in a left-right direction, and is provided with a transmission window 265 having a substantially rectangular shape through which light of the optical contact 30 passes. The light blocking piece 266 is positioned so as to enter between the light emitting circuit 300 and the light receiving circuit 301 in a state of separating from the light emitting circuit 300 and the light receiving circuit 301, at a position rightward of the light emitting circuit 300 of the optical contact 30 and leftward of the light receiving circuit 301 of the optical contact 30. Note that the movable member 26 is provided with a biasing portion 262 that is formed by the vicinity of the central portion being punched out and folded in an arc shape, and functions as a return spring, and a leading end of the biasing portion 262 is locked to the second locking terminal 221 formed in the vicinity of the central portion inside the contact chamber. The biasing portion 262 generates a reaction force to resist against the pressing of the pressing member 21. Bent portions 263 that are bent downward, which is a swinging direction, are formed in side portions of the movable member 26. The bent portions 263 are formed by downwardly folding protruding pieces that expand in a rectangular shape from both sides of the opposing side portions of the movable member 26.

In the contact mechanism constituted in this way, the pressing member 21 moves downward by receiving a pressing force from an outside source, and presses down the movable member 26. As a result of the movable member 26 being pressed down, the movable abutting portion 264 on a right end side, which is a free end of the movable member 26 moves downward, and the movable abutting portion 264 comes into contact with the fourth abutting part 320a of the third optical contact terminal 320. As a result of the movable abutting portion 264 of the metal movable member 26 coming into contact with the fourth abutting part 320a of the metal third optical contact terminal 320 in a collision-like manner, a metallic sound is generated. The user recognizes the metallic sound generated due to the movable member 26 coming into contact with the mounting optical contact terminal 32 as a click sound. The bent portions 263 resist against the warping of the movable member 26 when the movable member 26 warps upon receiving pressing from the pressing member 21, and therefore the operator can have a strong click feeling. Also, as a result of the right end side of the movable member 26 moving downward, the light blocking piece 266 of the movable member 26 moves downward, and the light of the optical contact 30 passes through the transmission window 265 provided in the light blocking piece 266 of the movable member 26, and the optical contact 30 enters an on state in which the circuit is closed and outputs an ON signal to an external electronic apparatus.

When the pressing of the pressing member 21 is removed, the movable member 26 is biased upward due to the reaction force of the biasing portion 262. As a result of the movable member 26 being biased upward, the pressing member 21 moves upward. Also, as a result of the movable member 26 being biased upward by the biasing portion 262, the movable abutting portion 264 that is positioned on the right end side of the movable member 26 moves upward, and comes into contact with the third abutting part 323a of the sixth optical contact terminal 323. Also, as a result of the right end side of the movable member 26 moving upward, the light blocking piece 266 of the movable member 26 moves upward, and the light of the optical contact 30 is blocked by the light blocking piece 266, and the optical contact 30 enters an off state in which the circuit is open.

Figure 39A:
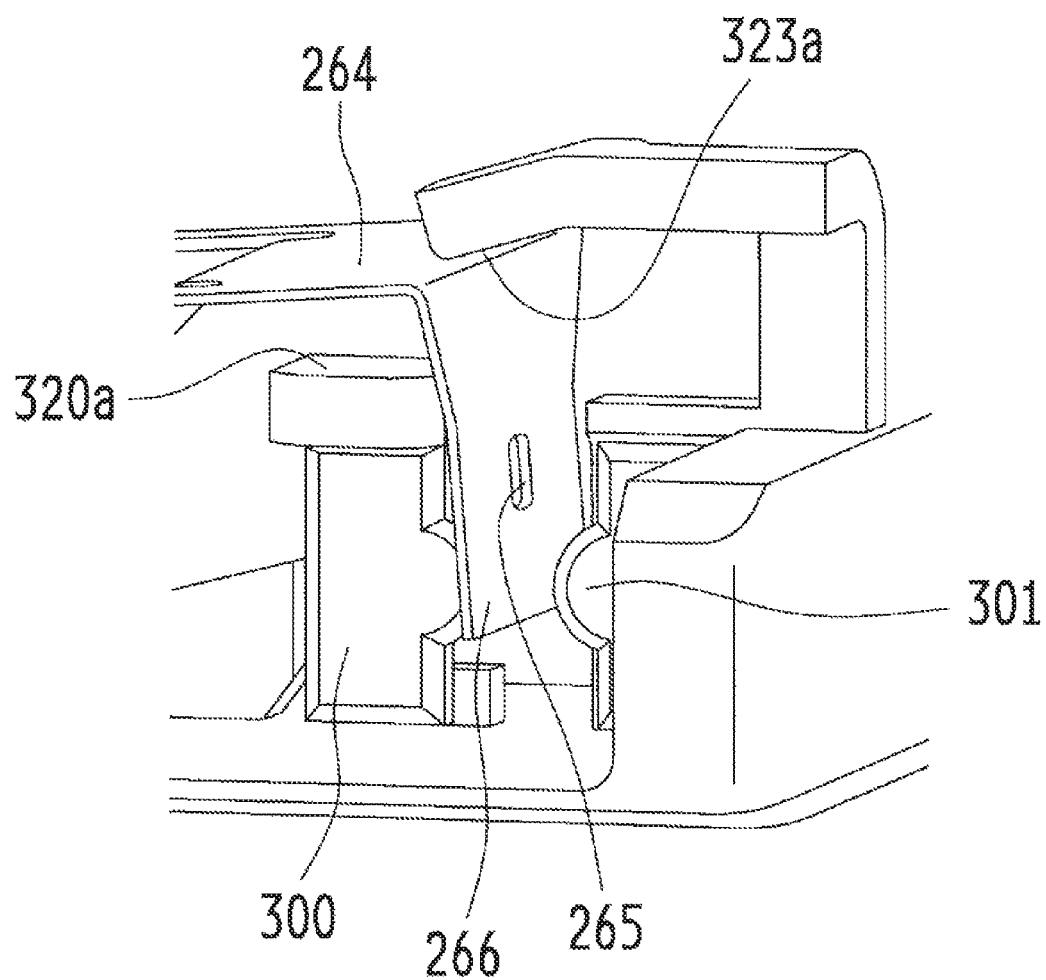
FIG. 39A is a schematic enlarged view illustrating a portion, in an enlarged manner, of one example of an internal structure of the switch described in the present application.
Figure 39B:
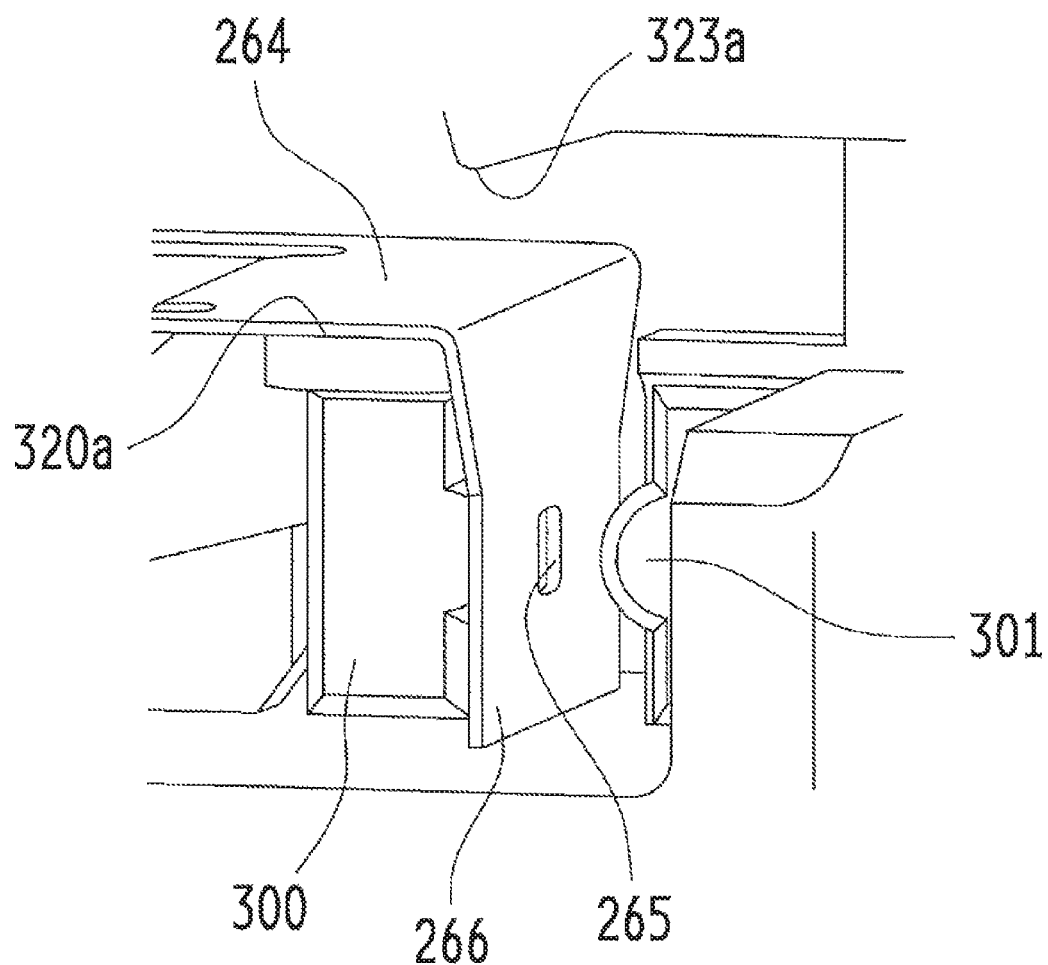
FIG. 39B is a schematic enlarged view illustrating a portion, in an enlarged manner, of one example of the internal structure of the switch described in the present application.

Opening/closing of the circuit of the optical contact 30 by the mounting optical contact terminals 32 and the movable member 26 will further be described. FIGS. 39A and 39B are schematic enlarged views illustrating a portion, in an enlarged manner, of one example of an internal structure of the switch 2 described in the present application. FIGS. 39A and 39B are schematic perspective views illustrating the vicinity of the light blocking piece 266 of the movable member 26 in an enlarged manner. FIG. 39A shows an off state in which the pressing member 21 is in an upper position, pressing by the pressing member 21 is removed, and the circuit is open, and the FIG. 39B shows an on state in which the pressing member 21 is in a lower position, the pressing member 21 performs pressing, and the circuit is closed.

When the pressing of the pressing member 21 is removed, the light blocking piece 266 of the movable member 26 has moved upward, as shown in FIG. 39A, the transmission window 265 of the light blocking piece 266 is outside of the light path from the light-emitting element 300b of the light emitting circuit 300 to the light receiving element 301b of the light receiving circuit 301. Therefore, the light emitted from the light-emitting element 300b of the light emitting circuit 300 is blocked by the light blocking piece 266 of the movable member 26, and therefore the light cannot reach the light receiving element 301b of the light receiving circuit 301, and the optical contact 30 enters an off state in which the circuit is open.

When the pressing member 21 is pressed, as shown in FIG. 39B, the light blocking piece 266 of the movable member 26 moves downward, and the light path from the light-emitting element 300b of the light emitting circuit 300 to the light receiving element 301b of the light receiving circuit 301 passes through the transmission window 265 provided in the light blocking piece 266. Therefore, the light emitted from the light-emitting element 300b of the light emitting circuit 300 passes through the transmission window 265 provided in the light blocking piece 266 of the movable member 26, and reaches the light receiving element 301b of the light receiving circuit 301, and therefore the optical contact 30 enters an on state in which the circuit is closed.

Regarding manufacturing of the switch 2 described in the present application having the structure described above, the base forms of the one connection terminal portion 22 and the four mounting optical contact terminals 32 are punched out by performing press forming such as punching on one conductive metal plate, for example. Moreover, the connection terminal portion 22 and the mounting optical contact terminals 32 are formed by performing press forming such as flange processing on the base forms of the connection terminal portion 22 and the mounting optical contact terminals 32 that are punched out. Then, the optical contact 30 is surface-mounted on the mounting optical contact terminals 32, and is molded along with the pressing member 21 and the movable member 26 and is housed inside the casing 20, and as a result, the switch 2 is formed. Then, the operation device 1 is completed by incorporating the formed switch 2.

As described above, the switch 2 described in the present application is formed by surface-mounting the optical contact 30 formed as a surface mounting type chip on the mounting optical contact terminals 32, and therefore the manufacturing process can be prevented from becoming complex, and can exert superior effects such as being able to expect cost down. Also, the size of the switch 2 described in the present application can be easily reduced by performing mounting as a surface mounting type chip. Also, when the optical contact 30 is surface-mounted on the mounting optical contact terminals 32, the manufacturer of the switch 2 can manage the processes from forming the optical contact 30 until surface-mounting and furthermore forming the switch 2 by molding. Therefore, the manufacturer of the switch 2 can integrally perform quality management on the optical contact 30, which is to be a sensor, and the operation mechanism, and can stabilize the quality by suppressing the variation in the operational characteristics. Note that, as a result of stabilizing the quality by suppressing the variation in the operational characteristics, it can be expected to speed up the output.

Moreover, the switch 2 described in the present application according to the fourth embodiment is provided with the bent portions 263, and therefore can generate click feeling when pressing down operation is performed on the pressing down operation portion 10 of the mouse, and when pressing down operation is performed, the metal movable member 26 comes into contact with a metal mounting optical contact terminal 32, which generates a metallic sound that is recognized as a click sound. In this way, the switch 2 can exert, although being a contactless switch, superior effects such as being able to generate click feeling and a click sound.

Embodiments are not limited to the embodiments described above, and can be expanded to other various modes. Therefore, the embodiments described above are merely examples in all aspects, and should not be restrictively interpreted. The technical scope is set forth in the claims, and is not constrained by the description of the specification. Moreover, modifications and changes belonging to the range of equivalency of the claims are all within the scope of the disclosed and recited embodiments.

For example, the first to fourth embodiments described above need not be separately implemented, and appropriate combinations are possible such as the pressing member 21 shown in the first and second embodiments being applied to the switch 2 including the optical contact 30 shown as the third and fourth embodiments.

Also, for example, in the embodiments described above, a mode is shown in which the bent portions 263 of the movable member 26 are bent downward, which is one direction of the swinging direction, but the bent portions 263 may be bent upward, which is the other direction of the swinging direction, as long as the bent portions are formed so as to resist against the warping of the movable member 26.

Also, in the embodiments described above, a mouse is illustrated as the operation device 1 including the switch 2, but the present invention is not limited thereto, and can be expanded to various modes such as a mode in which various devices such as a keyboard and various push buttons that are used for operation are applied as the operation device 1.

The invention claimed is:

1. A switch comprising:
a movable member having a first end side that is fixed as a swing fulcrum and a second end side that swings; and
a pressing member that contacts and presses a portion of the movable member between a first end and a second end of the movable member, by receiving a pressing force from an outside source, and opens/closes a circuit as a result of the movable member swinging by being flexed by the pressing from the pressing member; and
a buffering member comprising a contact buffering member provided such that the second end side of the movable member is brought into contact when the pressing member is not pressed from the outside, wherein
the movable member is provided with a bent portion that is bent in a swinging direction.

2. An operation device comprising:
a pressing down operation portion for receiving a pressing down operation from the outside; and
the switch according to claim 1 to which a pressing down operation received by the pressing down operation portion is transmitted as pressing from the outside, wherein
the operation device outputs a signal based on a motion of the movable member included in the switch.

3. The switch according to claim 1, wherein the buffering member is provided so as to come into contact with the movable member.

4. The switch according to claim 1, wherein the pressing member comes into contact with the movable member at a plurality of contact parts and presses the movable member.

5. The switch according to claim 4, wherein the pressing member includes the contact parts on the first end side and the second end side relative to a center of a force of pressing the movable member by receiving a pressing force from an outside source.

6. The switch according to claim 1, wherein the movable member is provided with a biasing portion that generates a reaction force that resists against pressing of the pressing member between a pressed part that receives a pressing force of the pressing member and the second end.

7. The switch according to claim 6, wherein the bent portion is formed between the pressed part and the first end.

8. The switch according to claim 6, wherein the bent portion is formed between the pressed part and the second end.

9. The switch according to claim 6, wherein the movable member is formed so as to flex by receiving pressing of the pressing member, and opens or closes the circuit by, upon receiving further pressing, the second end side swinging with a locking portion to which the biasing portion is locked being a swing axis.

10. The switch according to claim 6, further comprising a buffering member that is provided so as to come into contact with the movable member, wherein the buffering member comprises a biasing portion buffering member that is provided so as to come into contact with the biasing portion.

11. A switch comprising
a movable member having a first end side that is fixed as a swing fulcrum and a second end side that swings, the movable member having a bent portion that is bent in a swinging direction;
a pressing member that contacts and presses a portion of the movable member between a first end and a second end of the movable member, by receiving a pressing force from an outside source, and opens/closes a circuit as a result of the movable member swinging by being flexed by the pressing from the pressing member; and
an optical contact including a light emitting circuit and a light receiving circuit, wherein
the movable member includes a light blocking piece that blocks/transmits light emitted from the light emitting circuit of the optical contact by swinging.

12. An operation device comprising:
a pressing down operation portion for receiving a pressing down operation from the outside; and
the switch according to claim 11 to which a pressing down operation received by the pressing down operation portion is transmitted as pressing from the outside, wherein
the operation device outputs a signal based on a motion of the movable member included in the switch.

13. The switch according to claim 11, wherein the light blocking piece has a thin plate shape provided with a transmission window through which light passes.

14. The switch according to claim 11, further comprising an optical contact terminal that is electrically connected to the optical contact, wherein
the optical contact is
formed as a surface mounting type chip, and
surface-mounted on the optical contact terminal.

15. The switch according to claim 14, wherein the optical contact terminal is provided with a recess for surface-mounting the optical contact.

16. The switch according to claim 14, wherein the optical contact is mounted so as to extend between a plurality of optical contact terminals.

* * * * *